US010628025B2

United States Patent
White et al.

(10) Patent No.: US 10,628,025 B2
(45) Date of Patent: Apr. 21, 2020

(54) DEVICE, METHOD, AND GRAPHICAL USER INTERFACE FOR GENERATING HAPTIC FEEDBACK FOR USER INTERFACE ELEMENTS

(71) Applicant: Apple Inc, Cupertino, CA (US)

(72) Inventors: Samuel C. White, San Jose, CA (US); Darren C. Minifie, Cupertino, CA (US); Christopher B. Fleizach, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1103 days.

(21) Appl. No.: 14/183,423

(22) Filed: Feb. 18, 2014

(65) Prior Publication Data

US 2014/0281950 A1 Sep. 18, 2014

Related U.S. Application Data

(60) Provisional application No. 61/852,200, filed on Mar. 15, 2013.

(51) Int. Cl.
*G06F 3/0488* (2013.01)
*G09B 21/00* (2006.01)
(Continued)

(52) U.S. Cl.
CPC ............ *G06F 3/0488* (2013.01); *G06F 3/016* (2013.01); *G06F 3/04842* (2013.01); *G09B 21/003* (2013.01); *G06F 2203/04805* (2013.01)

(58) Field of Classification Search
CPC ........... G06F 1/1694; G06F 2200/1637; G06F 3/016; G06F 3/0487; G06F 15/0291; G06F 2200/1636
See application file for complete search history.

(56) References Cited

U.S. PATENT DOCUMENTS

2007/0229233 A1 10/2007 Dort
2012/0299853 A1* 11/2012 Dagar .................. G06F 3/016
345/173

(Continued)

OTHER PUBLICATIONS

Jiung-yao Huang, Ming-Chih Tung, Kuei Min Wang, Kuo-Jui Chang, "A User Interface for the Visual-Impairment," copyright 2004, published in Displays 25 (2004) by www.sciencedirect.com, p. 151-157, http://www.sciencedirect.com/science/article/pii/S014193820400068X.*

(Continued)

*Primary Examiner* — Kavita Padmanabhan
*Assistant Examiner* — Warren Campbell, Jr.
(74) *Attorney, Agent, or Firm* — Dentons US LLP

(57) ABSTRACT

An electronic device in communication with a haptic feedback device that includes a touch-sensitive surface sends instructions to the haptic display to display a document with multiple characters. A respective character is displayed at a respective character size. While the haptic display is displaying the document, the device receives an input that corresponds to a finger contact at a first location on the haptic display. In response to receiving the input, the device associates a first cursor position with the first location, determines a first character in the plurality of characters adjacent to the first cursor position, and sends instructions to the haptic display to output a Braille character, at the first location, that corresponds to the first character. A respective Braille character is output on the haptic display at a respective Braille character size that is larger than the corresponding displayed character size.

24 Claims, 45 Drawing Sheets

(51) Int. Cl.
*G06F 3/0484* (2013.01)
*G06F 3/01* (2006.01)

(56) References Cited

U.S. PATENT DOCUMENTS

2013/0016042 A1* 1/2013 Makinen .............. G06F 3/016
 345/168
2013/0044100 A1* 2/2013 King .................... G06F 3/016
 345/419

OTHER PUBLICATIONS

Jiung-yao Huang, Ming-Chih Tung, Kuei Min Wang, Kuo-Jui Chang, "A User Interface for the Visual-Impairment," copyright 2004, published in Displays 25 (2004) by www.sciencedirect.com, http://www.sciencedirect.com/science/article/pii/S014193820400068X, p. 151-157.*

CAL, "Creative Adaptations for Learning", CAL Brochure, 2002, 2 pages.

Fukuda et al., "Ubiquitous Mathematical Graphic Viewer for Visually Impaired Students", Available at <http://atcm.mathandtech.org/EP2011/regular_papers/3272011_19146.pdf>, retrieved on Oct. 7, 2014, 8 pages.

GH LLC, "Tactile (LaserLine™) Graphics", Available at <http://www.ghbraille.com/services/graphics>, 2011, 2 pages.

Mobiledia, "New Touch Screens Allow Blind to Read Braille", Available at <http://news.yahoo.com/touch-screens-allow-blind-read-braille-150926613.html>, Jul. 12, 2011, 6 pages.

Openstreetmap, "User:Head/HaptoRender", Available at <http://wiki.openstreetmap.org/wiki/User:Head/HaptoRender>, last modified on Sep. 28, 2011, 5 pages.

Pappas et al., "Perceptual Dimensions for a Dynamic Tactile Display", Human Vision and Electronic Imaging XIV, Proc. SPIE, vol. 7240, Jan. 19-22, 2009, 12 pages.

Toennies et al., "Toward Haptic/Aural Touchscreen Display of Graphical Mathematics for the Education of Blind Students", IEEE World Haptics Conference, Jun. 21-24, 2011, pp. 373-378.

Yoshikawa et al., "Virtual Haptic Map Using Haptic Display Technology for Visually Impaired", ResearchGate, available at <http://www.researchgate.net/publication/226396300_Virtual_Haptic_Map_Using_Haptic_Display_Technology_for_Visually_Impaired>, retrieved on Oct. 7, 2014, 8 pages.

* cited by examiner

Document 5000

Four score and seven years ago our fathers brought forth on this continent a new nation, conceived in liberty, and dedicated to the proposition that all men are created equal.

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

5006      5004-a

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

—5002

Touch Screen 112

Figure 5A

Document 5000

Four score and seven years ago our fathers brought forth on this continent a new nation, conceived in liberty, and dedicated to the proposition that all men are created equal.

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

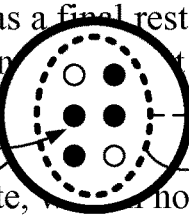

5010-1
5008-a        5004-a  5012

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

—5002

Touch Screen 112

Figure 5B

Document 5000

Four score and seven years ago our fathers brought forth on this continent a new nation, conceived in liberty, and dedicated to the proposition that all men are created equal.

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

5010-2
5008-b
5004-b
5012
5002

Touch Screen 112

Figure 5C

Document 5000

Four score and seven years ago our fathers brought forth on this continent a new nation, conceived in liberty, and dedicated to the proposition that all men are created equal.

Now we are engaged in a great civil war, testing whether that —5014 nation, or any nation, so conceived and so dedicated, can long endure. We are met on a great battle-field of that war. We have come to dedicate a portion of that field, as a final resting place for those who here gave their lives that that nation might live. It is altogether fitting and proper that we should
5010-3
5008-c —5004-c
But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

—5002

Touch Screen 112

Figure 5D

Document 5000

Four score and seven years ago our fathers brought forth on this continent a new nation, conceived in liberty, and dedicated to the proposition that all men are created equal.

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

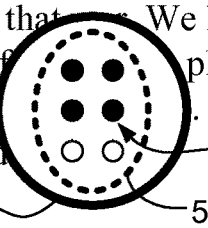

5008-d    5010-4
           5004-d

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

—5002

Touch Screen 112

Figure 5E

Document 5000

Four score and seven years ago our fathers brought forth on this continent a new nation, conceived in liberty, and dedicated to the proposition that all men are created equal.

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

5002

Touch Screen 112

Figure 5F

Document 5000

Four score and seven years ago our fathers brought forth on this continent a new nation, conceived in liberty, and dedicated to the proposition that all men are created equal. 5018-a 5020-1  5016-a Now we are engaged in a great civil war, whether that nation, or any nation, so conceived and, can long endure. We are met on a great battle-field r. We have come to dedicate a portion of that field, as resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

5002

Touch Screen 112

Figure 5G

Document 5000

Four score and seven years ago our fathers brought forth on this continent a new nation, conceived in liberty, and dedicated to the proposition that all men are created equal.

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

Touch Screen 112

Figure 5H

Document 5000

Four score and seven years ago our fathers brought forth on this continent a new nation, conceived in liberty, and dedicated to the proposition that all men are created equal. 5018-a 5022   5020-1   5016-a  5020-2

Now we are engaged in a great civil war, whether that nation, or any nation, so conceived and , can long endure. We are met on a great battle-field r. We have come to dedicate a portion of that field, as resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

—5002

Touch Screen 112

Figure 5I

Document  5000

Four score and seven years ago our fathers brought forth on this continent a new nation, conceived in liberty, and dedicated to the proposition that all men are created equal.  —5018-a 5022  5020-2  —5016-a Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

—5002

Touch Screen 112

Figure 5J

Document 5000

Four score and seven years ago our fathers brought forth on this continent a new nation, conceived in liberty, and dedicated to the proposition that all men are created equal. 5018-a 5022  5020-3  5016-a Now we are engaged in a great civil war, ether that nation, or any nation, so conceived and can long endure. We are met on a great battle-fie r. We have come to dedicate a portion of that field, as resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

5002

Touch Screen 112

Figure 5K

Document 5000

Four score and seven years ago our fathers brought forth on this continent a new nation, conceived in liberty, and dedicated to the proposition that all men are created equal.

5025 —— 5024-a

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

— 5002

Touch Screen 112

Figure 5L

Document 5000

Four score and seven years ago our father brought forth on this continent a new nation, conceived  and dedicated to the proposition that all men are created —5026-a
5028  —5024-a
Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

—5002

Touch Screen 112

Figure 5M

Document 5000

Four score and seven years ago our fathers brought forth on this continent a new nation, conceived in liberty, and dedicated to the proposition that all men are created equal.

5031            5030-a

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

5002

Touch Screen 112

Figure 5N

Document  5000

Four score and seven years ago our fathers brought forth on this continent a new nation, conceived in liberty, and dedicated to the proposition that all men are created equal. — 5032-a 5031   5034   5030-a Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

—5002

Touch Screen 112

Figure 5O

Document 5000

_5037_

Four score and seven years ago our fathers brought forth on this continent a new nation, conceived in liberty, and dedicated to the proposition that all men are created equal.

—5036-a

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

—5002

Touch Screen 112

Figure 5P

Document 5000

Four score and seven years ago our fathers brought forth on this continent a new nation, conceived in liberty, and dedicated to the proposition that all men are created equal.

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

Touch Screen 112

Figure 5Q

Document 5000

Table of Various Elements and their Atomic Numbers

| Element | | Atomic Number | |
|---|---|---|---|
| Hydroden | 5046-1 | 1 | 5046-9 |
| Carbon | 5046-2 | 6 | 5046-10 |
| Nitrogen | 5046-3 | 7 | 5046-11 |
| Oxygen | 5046-4 | 8 | 5046-12 |
| Aluminum | 5046-5 | 13 | 5046-13 |
| Chlorine | 5046-6 | 17 | 5046-14 |
| Silver | 5046-7 | 47 | 5046-15 |
| Gold | 5046-8 | 79 | 5046-16 |

5048-a

5050

5042

Touch Screen 112

Figure 5R

Document 5000

5044

Table of Various Elements and their Atomic Numbers

| Element | Atomic Number |
|---|---|
| Hydroden | 1 |
| Carbon | 6 |
| Nitrogen | 7 |
| Oxygen | 8 |
| Aluminum | 13 |
| Chlorine  —5052-a | 17 |
| Silver | 47 |
| Gold    5046-8 | 79 |

5048-a

5050

5054

5042

Touch Screen 112

5114

5116

5118

5120

DEVICE, METHOD, AND GRAPHICAL USER INTERFACE FOR GENERATING HAPTIC FEEDBACK FOR USER INTERFACE ELEMENTS

RELATED APPLICATIONS

This application claims priority to U.S. Provisional Patent Application No. 61/852,200 filed Mar. 15, 2013, which application is incorporated by reference herein in its entirety.

TECHNICAL FIELD

This relates generally to electronic devices with touch-sensitive surfaces, and haptic displays or haptic feedback devices, including but not limited to electronic devices with touch-sensitive surfaces, and haptic displays or haptic feedback devices, that generate haptic feedback for user interface elements.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or elements, navigating through graphical user interfaces having one or more user interface objects or elements, navigating or reading documents or other text, or activating buttons or other user interface objects or elements, as well as otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. These existing methods are especially difficult for users with impaired vision, such as blind or low-vision users, to use.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient, and more low vision-friendly methods and interfaces for presenting documents. Such methods and interfaces may complement or replace conventional methods for presenting documents. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device in communication with a haptic display that includes a touch-sensitive surface. The method includes: sending instructions to the haptic display to display at least a portion of a document that includes a plurality of characters, where a respective character is displayed at a respective displayed character size on the haptic display. The method also includes, while the haptic display is displaying at least the portion of the document, receiving an input that corresponds to a finger contact at a first location on the haptic display. The method further includes, in response to receiving the input that corresponds to the finger contact at the first location on the haptic display: associating a first cursor position with the first location on the haptic display; determining a first character in the plurality of characters adjacent to the first cursor position; and sending instructions to the haptic display to output a Braille character, at the first location on the haptic display, that corresponds to the first character, where a respective Braille character is output on the haptic display at a respective Braille character size, the respective Braille character size being larger than the corresponding displayed character size.

In accordance with some embodiments, an electronic device, in communication with a haptic display unit that includes a touch-sensitive surface unit, includes a processing unit. The processing unit is configured to: send instructions to the haptic display unit to display at least a portion of a document that includes a plurality of characters, wherein a respective character is displayed at a respective displayed character size on the haptic display unit; while the haptic display unit is displaying at least the portion of the document, receive an input that corresponds to a finger contact at a first location on the haptic display unit; and, in response to receiving the input that corresponds to the finger contact at the first location on the haptic display unit: associate a first cursor position with the first location on the haptic display unit; determine a first character in the plurality of characters adjacent to the first cursor position; and send instructions to the haptic display unit 902 to output a Braille character, at the first location on the haptic display unit, that corresponds to the first character, wherein a respective Braille character is output on the haptic display unit at a respective Braille character size, the respective Braille character size being larger than the corresponding displayed character size.

Thus, electronic devices with haptic displays that include touch-sensitive surfaces are provided with faster, more efficient methods and interfaces for presenting documents, thereby increasing the effectiveness, efficiency, and user satisfaction with such devices. Such methods and interfaces may complement or replace conventional methods for presenting documents.

There is a need for electronic devices with faster, more efficient methods and interfaces for presenting virtual musical instruments. Such methods and interfaces may complement or replace conventional methods for presenting virtual musical instruments. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device in communication with a haptic display that includes a touch-sensitive surface. The method includes: sending instructions to the haptic display to display a plurality of playable elements of one or more musical instruments. The method also includes, while the plurality of playable elements is displayed on the haptic display: receiving an input that corresponds to a finger input on the haptic display at a location that corresponds to a first playable element; and, in response to receiving an input that corresponds to the finger input on the haptic display at the location that corresponds to the first playable element, sending instructions to the haptic display to provide haptic feedback that corresponds to the first playable element.

In accordance with some embodiments, an electronic device, in communication with a haptic display unit that includes a touch-sensitive surface unit, includes a processing unit. The processing unit is configured to: send instructions to the haptic display unit to display a plurality of playable elements of one or more musical instruments; and, while the plurality of playable elements is displayed on the haptic display unit: receive an input that corresponds to a finger input on the haptic display unit at a location that corresponds to a first playable element; and, in response to receiving an input that corresponds to the finger input on the haptic display unit at the location that corresponds to the first playable element, send instructions to the haptic display unit to provide haptic feedback that corresponds to the first playable element.

Thus, electronic devices with haptic displays that include touch-sensitive surfaces are provided with faster, more efficient methods and interfaces for presenting virtual musical instruments, thereby increasing the effectiveness, efficiency, and user satisfaction with such devices. Such methods and interfaces may complement or replace conventional methods for presenting virtual musical instruments.

There is a need for electronic devices with faster, more efficient methods and interfaces for presenting changes to user interface elements. Such methods and interfaces may complement or replace conventional methods for presenting changes to user interface elements. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device in communication with a haptic feedback device integrated with a touch-sensitive surface. The method includes: sending instructions to the haptic feedback device to tactily present a user interface that includes a plurality of user interface elements on the haptic feedback device, wherein a first user interface element corresponds to a first location on the haptic feedback device; receiving a request to present a change to the first user interface element; and, in response to receiving the request to present the change to the first user interface element, sending instructions to the haptic feedback device to indicate the location of the first user interface element by providing haptic feedback of a first type at least at a respective location on the haptic feedback device distinct from the first location.

In accordance with some embodiments, an electronic device, in communication with a haptic feedback device unit integrated with a touch-sensitive surface unit, includes a processing unit. The processing unit is configured to: send instructions to the haptic feedback device unit to tactilely present a user interface that includes a plurality of user interface elements on the haptic feedback device unit, wherein a first user interface element corresponds to a first location on the haptic feedback device unit; receive a request to present a change to the first user interface element; and, in response to receiving the request to present the change to the first user interface element, send instructions to the haptic feedback device unit to indicate the location of the first user interface element by providing haptic feedback of a first type at least at a respective location on the haptic feedback device unit distinct from the first.

Thus, electronic devices in communication with haptic feedback devices integrated with touch-sensitive surfaces are provided with faster, more efficient methods and interfaces for presenting changes to user interface elements, thereby increasing the effectiveness, efficiency, and user satisfaction with such devices. Such methods and interfaces may complement or replace conventional methods for presenting changes to user interface elements.

In accordance with some embodiments, an electronic device in communication with a haptic display that includes a touch-sensitive surface includes one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device, in communication with a haptic display that includes a touch-sensitive surface, with a memory and one or more processors to execute one or more programs stored in the memory, includes one or more of the elements displayed in any of the methods described above, which are updated in response to inputs, as described in any of the methods described above. In accordance with some embodiments, a computer readable storage medium has stored therein instructions which when executed by an electronic device in communication with a haptic display that includes a touch-sensitive surface, cause the device to perform the operations of any of the methods described above. In accordance with some embodiments, an electronic device in communication with a haptic display that includes a touch-sensitive surface includes: means for performing the operations of any of the methods described above. In accordance with some embodiments, an information processing apparatus, for use in an electronic device in communication with a haptic display that includes a touch-sensitive surface, includes means for performing the operations of any of the methods described above.

In accordance with some embodiments, an electronic device in communication with a haptic feedback device integrated with a touch-sensitive surface includes one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device, in communication with a haptic feedback device integrated with a touch-sensitive surface, with a memory and one or more processors to execute one or more programs stored in the memory, includes one or more of the elements displayed in any of the methods described above, which are updated in response to inputs, as described in any of the methods described above. In accordance with some embodiments, a computer readable storage medium has stored therein instructions which when executed by an electronic device in communication with a haptic feedback device integrated with a touch-sensitive surface, cause the device to perform the operations of any of the methods described above. In accordance with some embodiments, an electronic device in communication with a haptic feedback device integrated with a touch-sensitive surface includes: means for performing the operations of any of the methods described above. In accordance with some embodiments, an information processing apparatus, for use in an electronic device in communication with a haptic feedback device integrated with a touch-sensitive surface, includes means for performing the operations of any of the methods described above.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The methods, devices and GUIs described herein provide visual and/or haptic feedback that makes manipulation of user interface objects or elements more efficient and intuitive for a user. For example, in a device where text is displayed on a haptic display that includes a touch-sensitive surface, the device can detect a contact over the text on the haptic display; associate a cursor position with the contact location; and output, at the contact location, a Braille character corresponding to a character at the cursor position in the text. Additionally, the output Braille character changes as the contact moves across the text.

Additionally, in a device where user interface elements corresponding to musical instruments displayed on a haptic display that includes a touch-sensitive surface, the device can detect a finger input over a user interface element corresponding to a playable element of a musical instrument, and provide haptic feedback corresponding to the playable element. The haptic feedback can vary depending on whether the finger input plays the playable element or not.

Additionally, for a device in communication with a haptic feedback device integrated with a touch-sensitive surface, user interface elements are presented tactilely. When a change to a user interface element occurs, haptic feedback is output to indicate the location of the changing user interface element.

A number of different approaches to providing a user interface that is friendly to users with impaired vision on a device are described below. Using one or more of these approaches (optionally in conjunction with each other) helps to provide a user interface that provides users with impaired vision with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges.

Figure 5S:
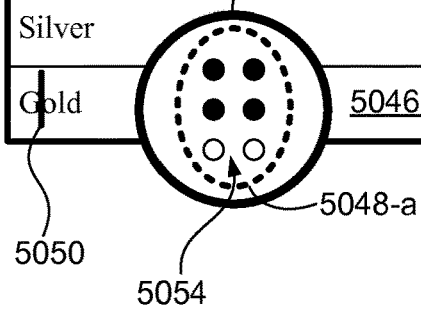
FIGS. 5A-5DD illustrate exemplary user interfaces for providing haptic feedback for user interface elements in accordance with some embodiments.
Figure 5T:
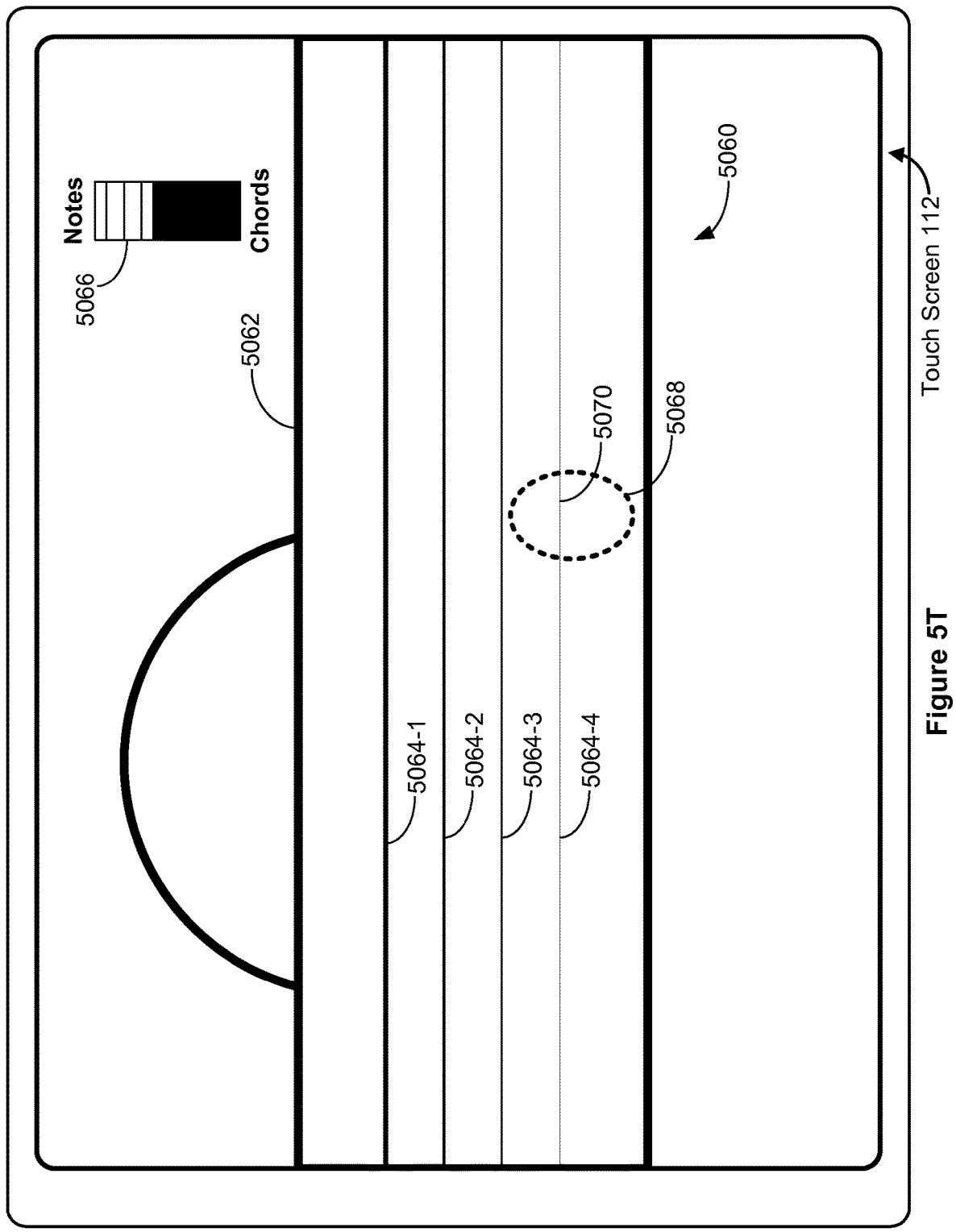
Figure 5U:
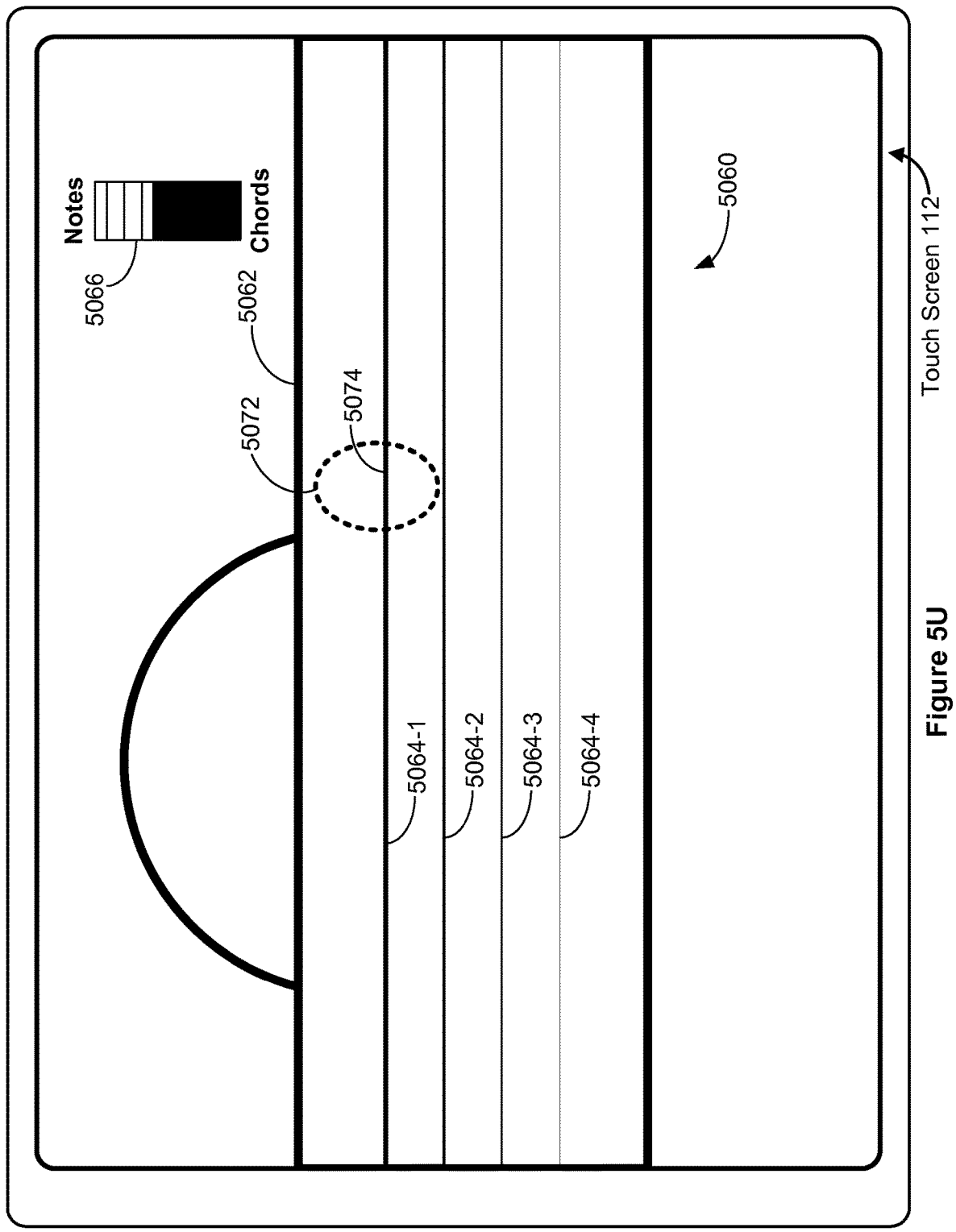
Figure 5V:
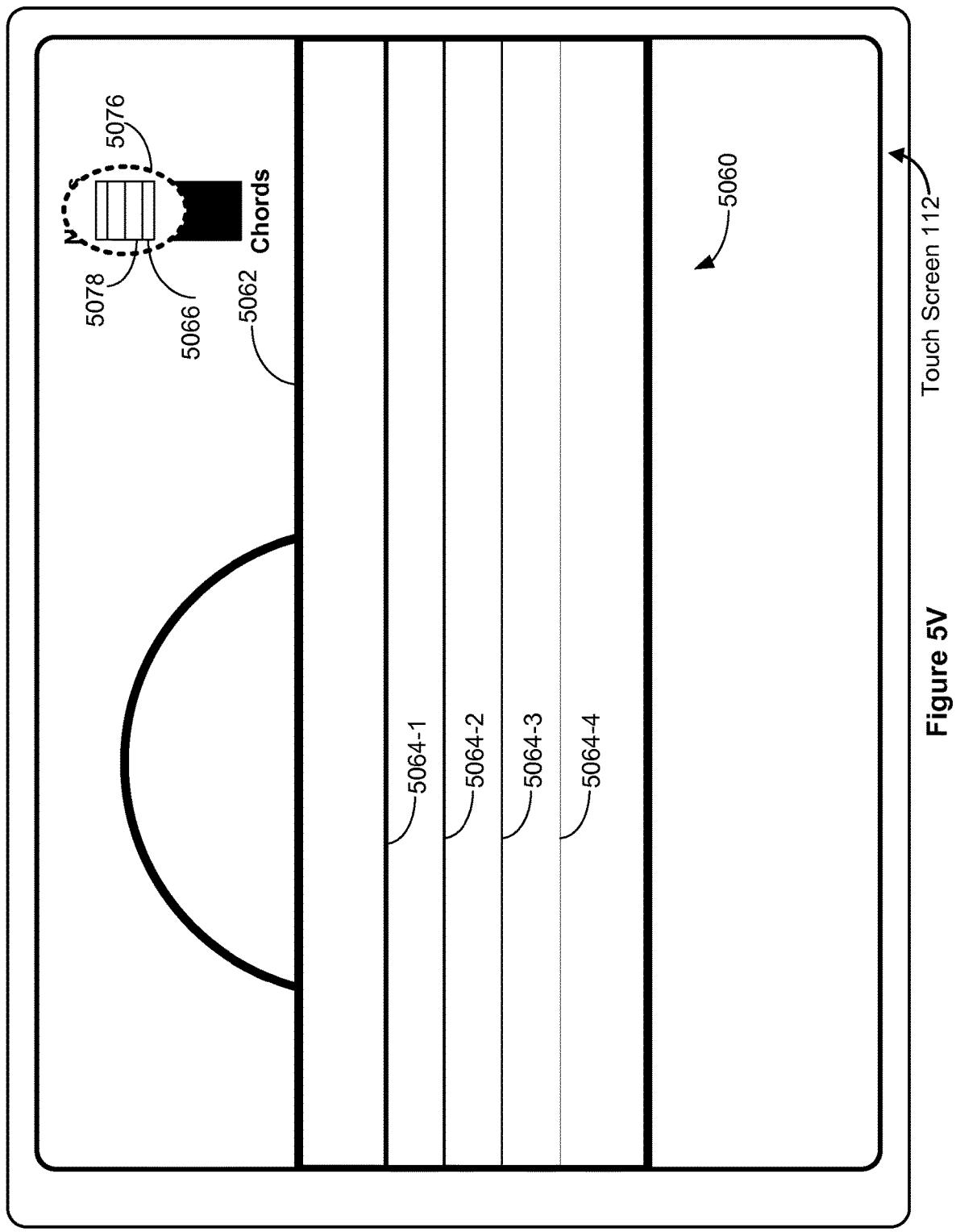
Figure 5W:
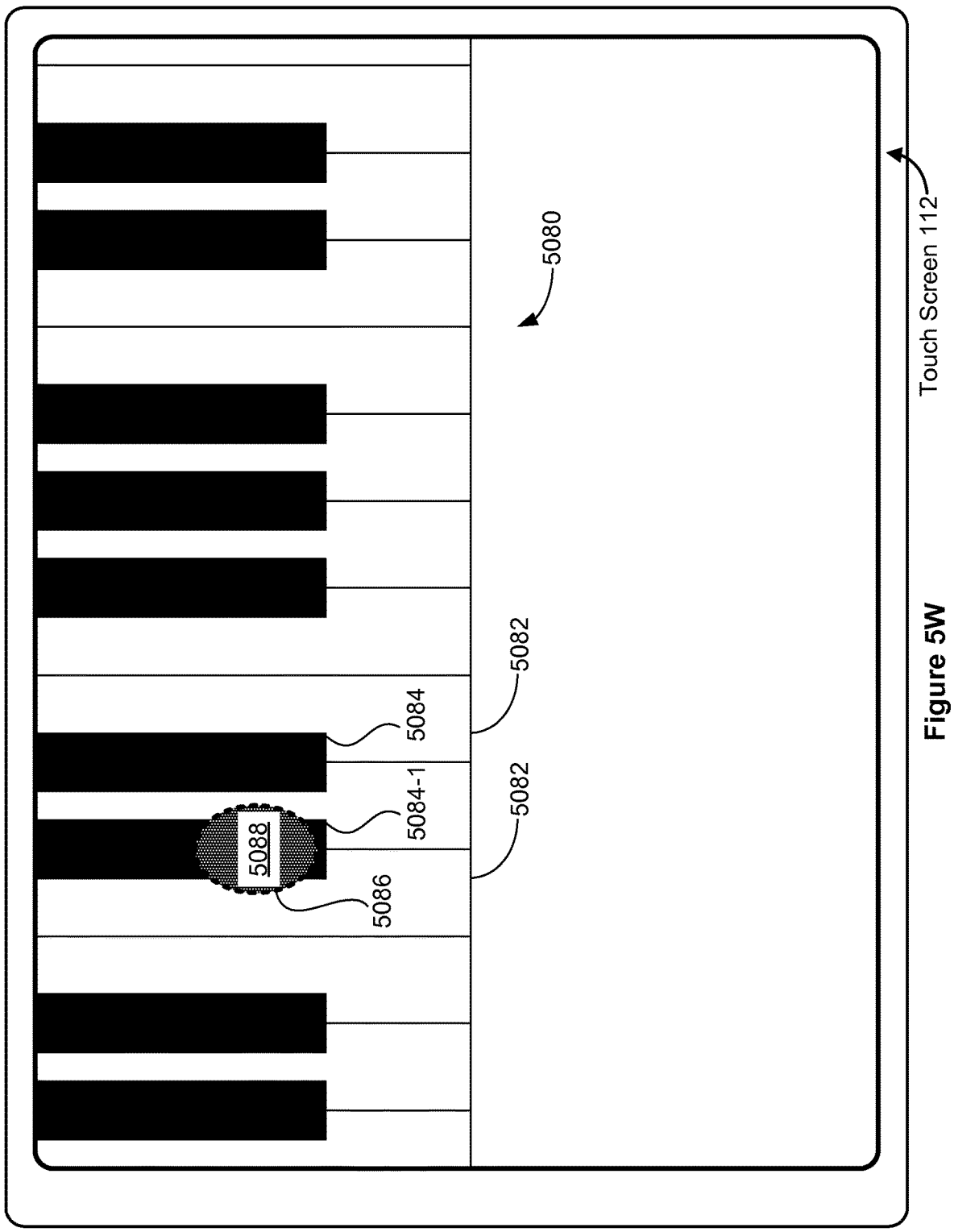
Figure 5X:
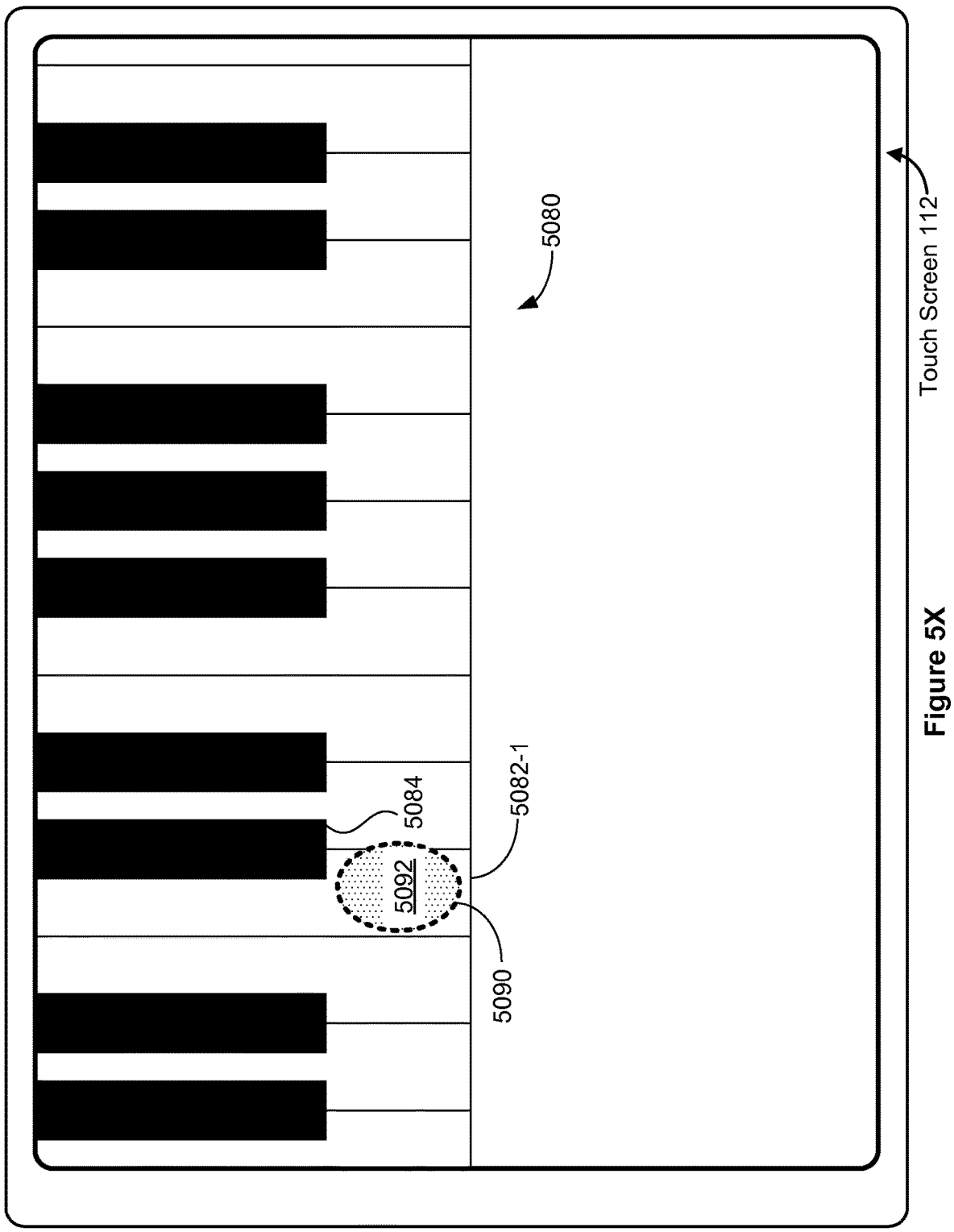
Figure 5Y:
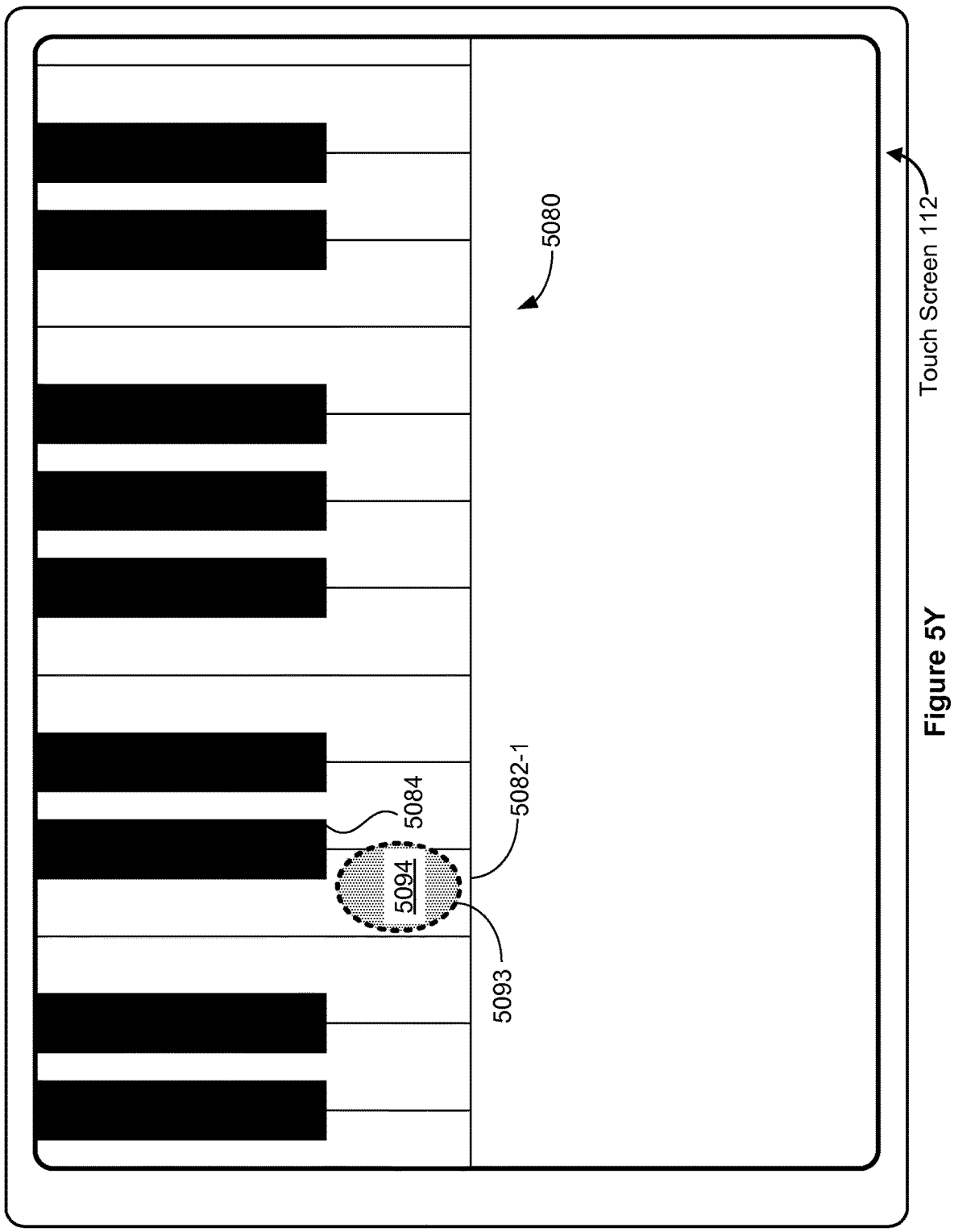
Figure 5Z:
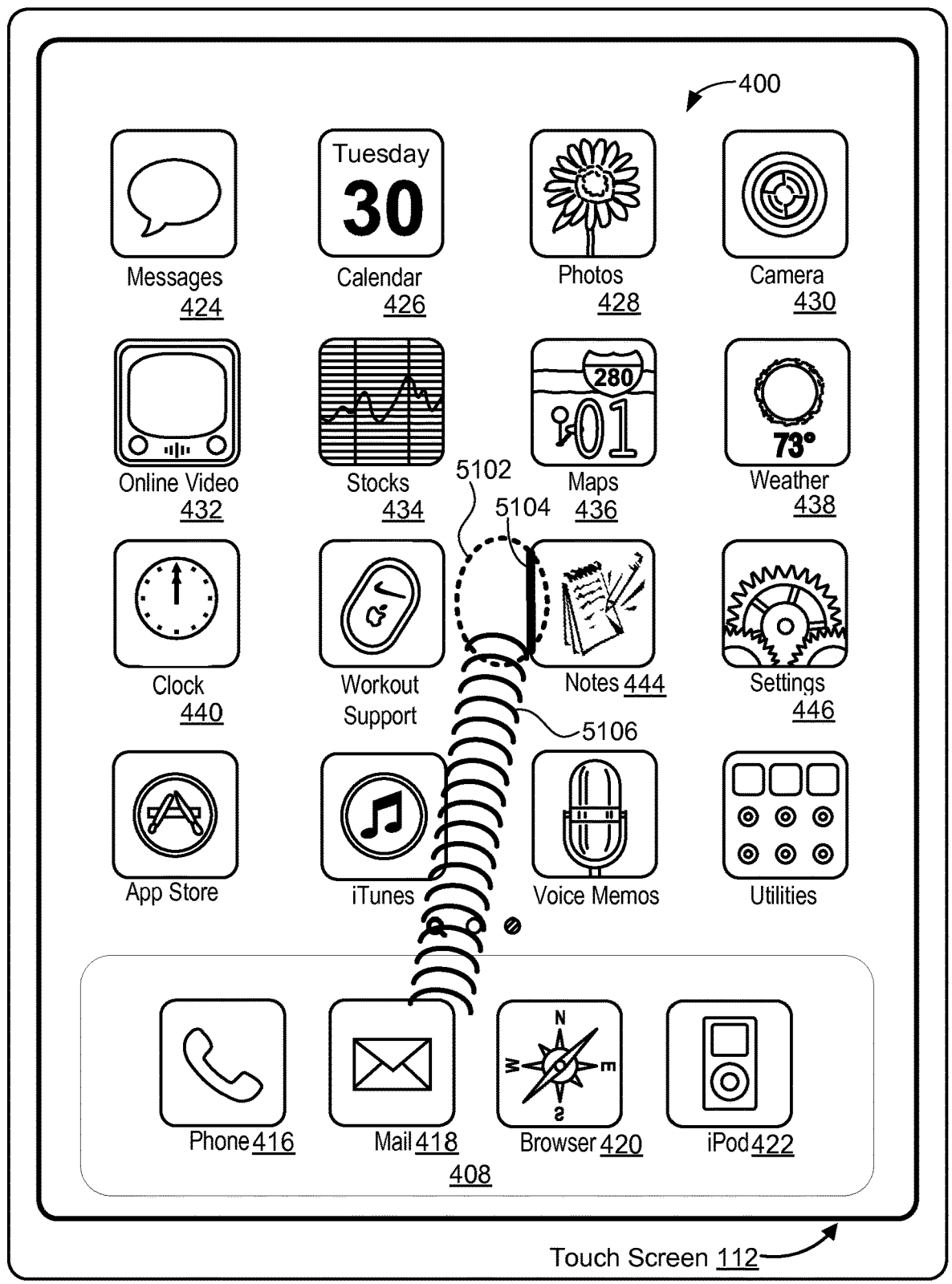
Figure 5A:
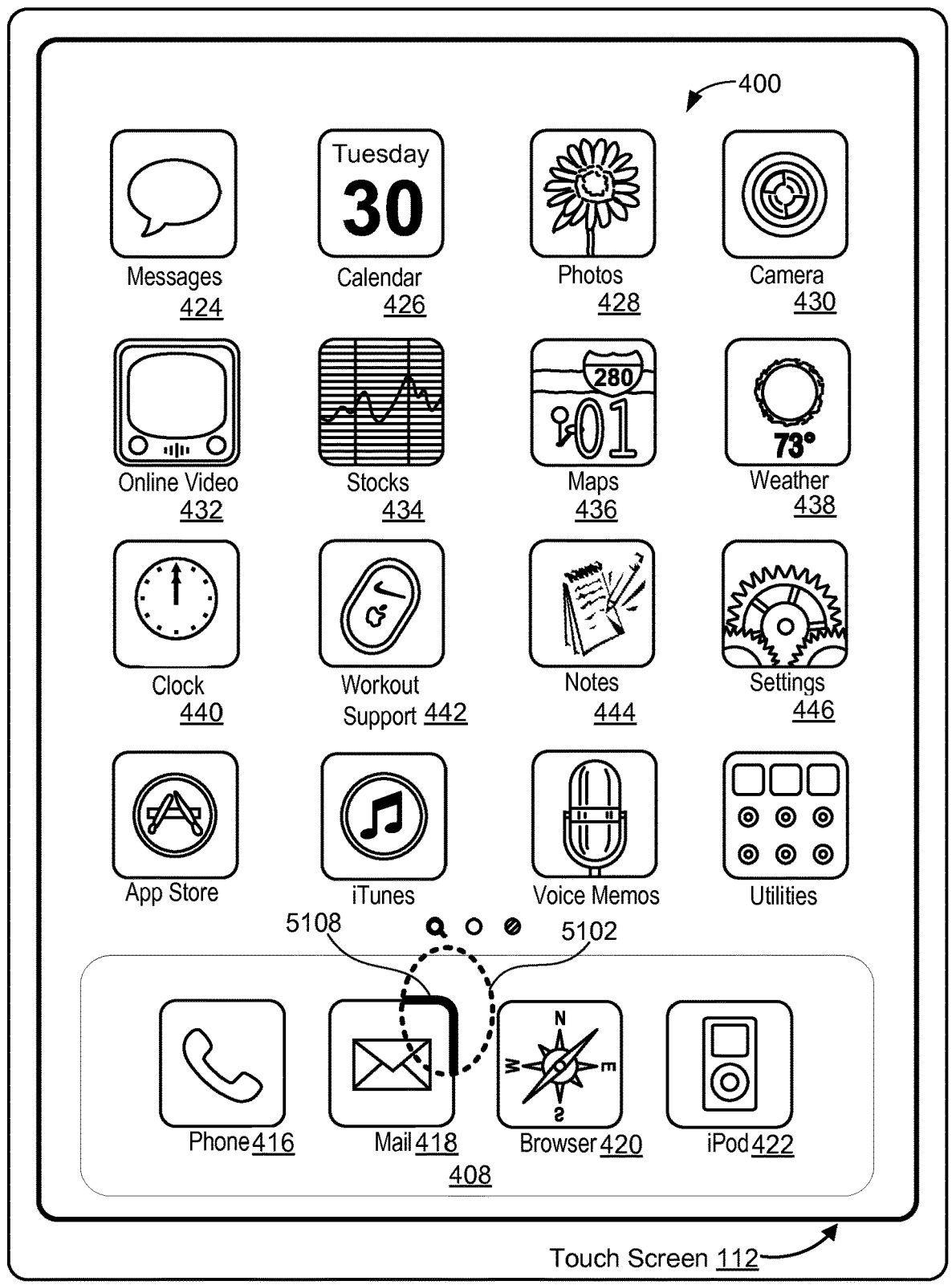
Figure 6A:
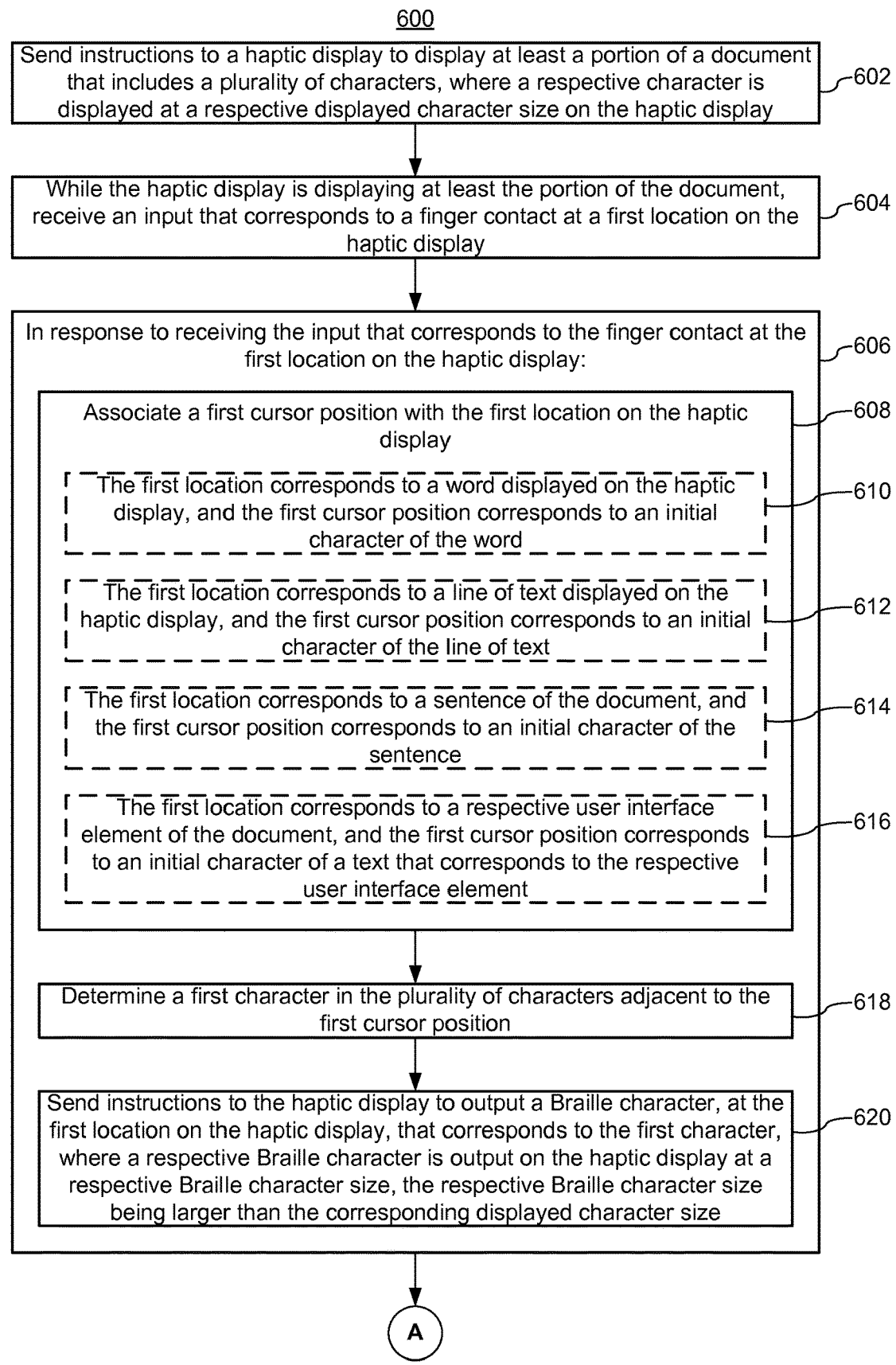
FIGS. 6A-6B are flow diagrams illustrating a method of presenting documents in accordance with some embodiments.
Figure 6B:
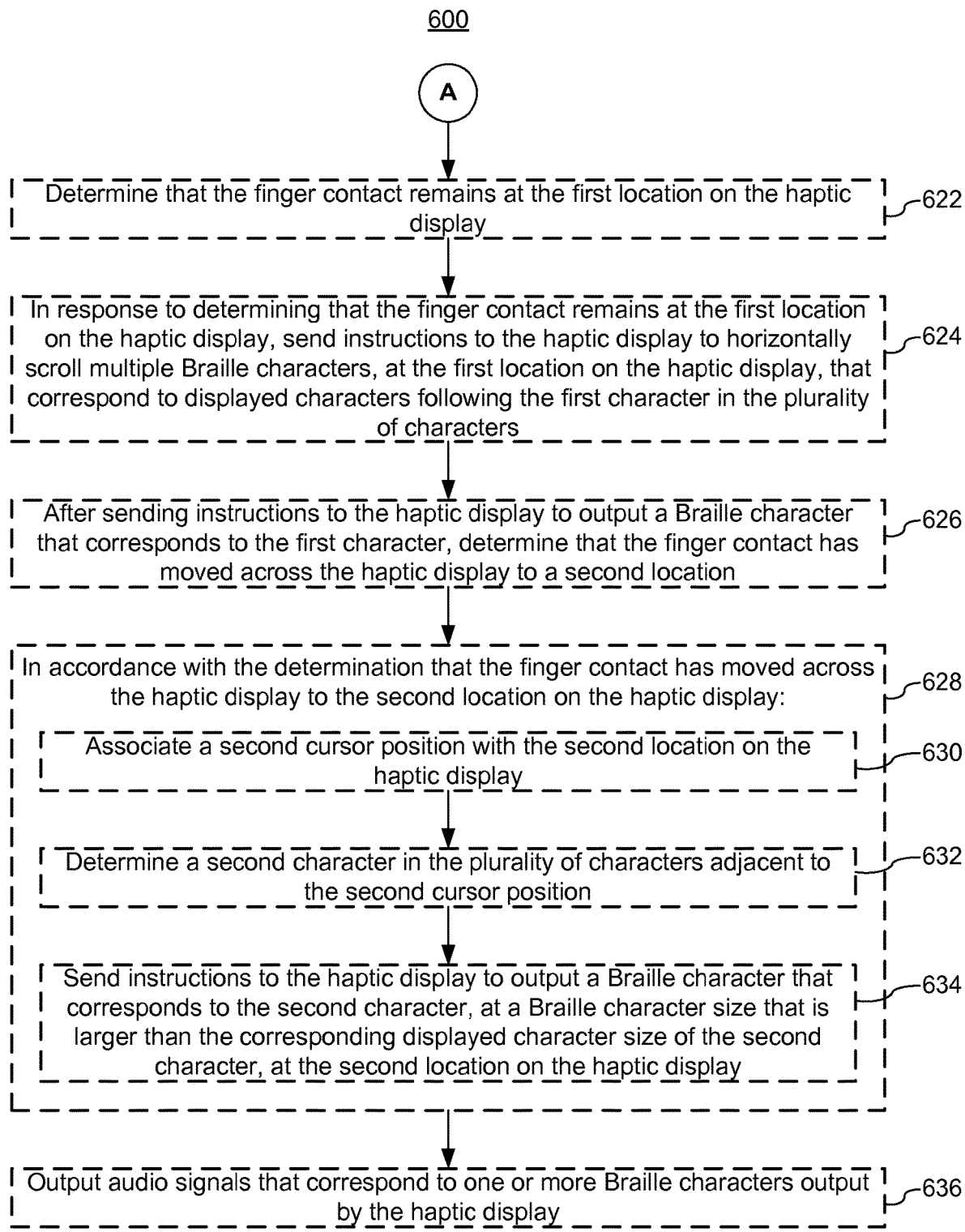

Below, FIGS. 5A-5S illustrate exemplary user interfaces for presenting documents. FIGS. 6A-6B are flow diagrams illustrating a method of presenting documents. The user interfaces in FIGS. 5A-5S are used to illustrate the processes in FIGS. 6A-6B.

Figure 7A:
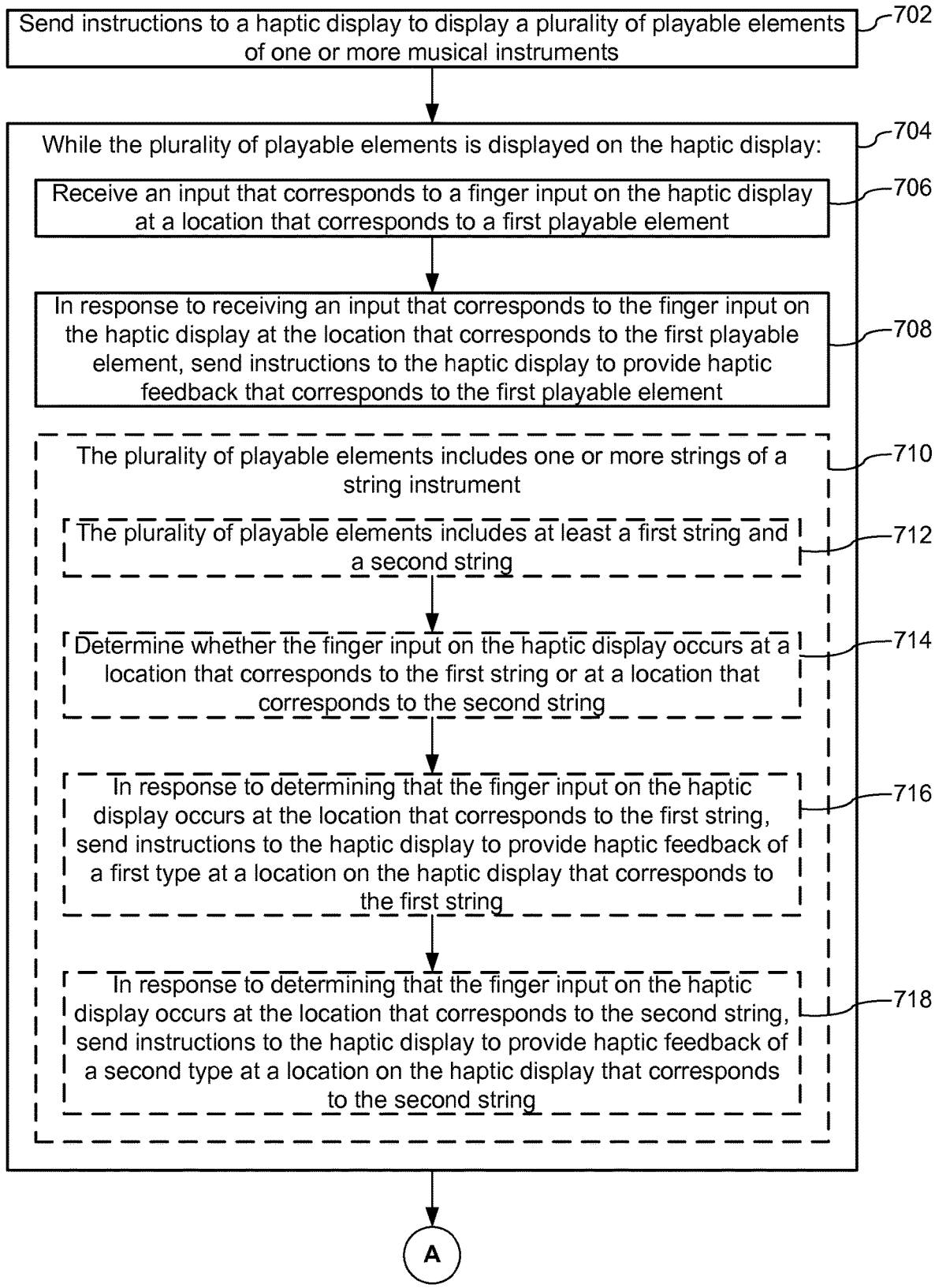
FIGS. 7A-7C are flow diagrams illustrating a method of presenting virtual musical instruments in accordance with some embodiments.
Figure 7B:
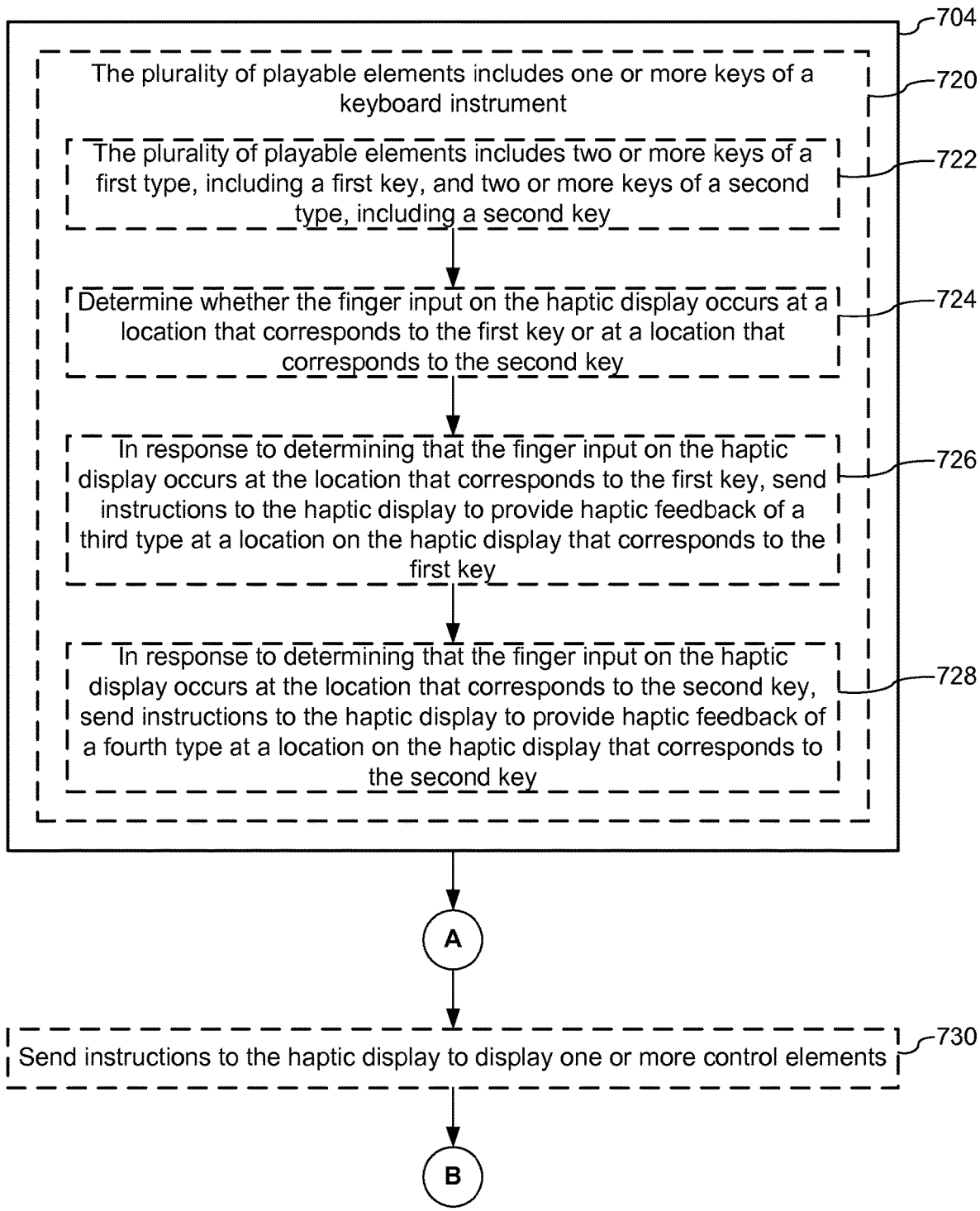
Figure 7C:
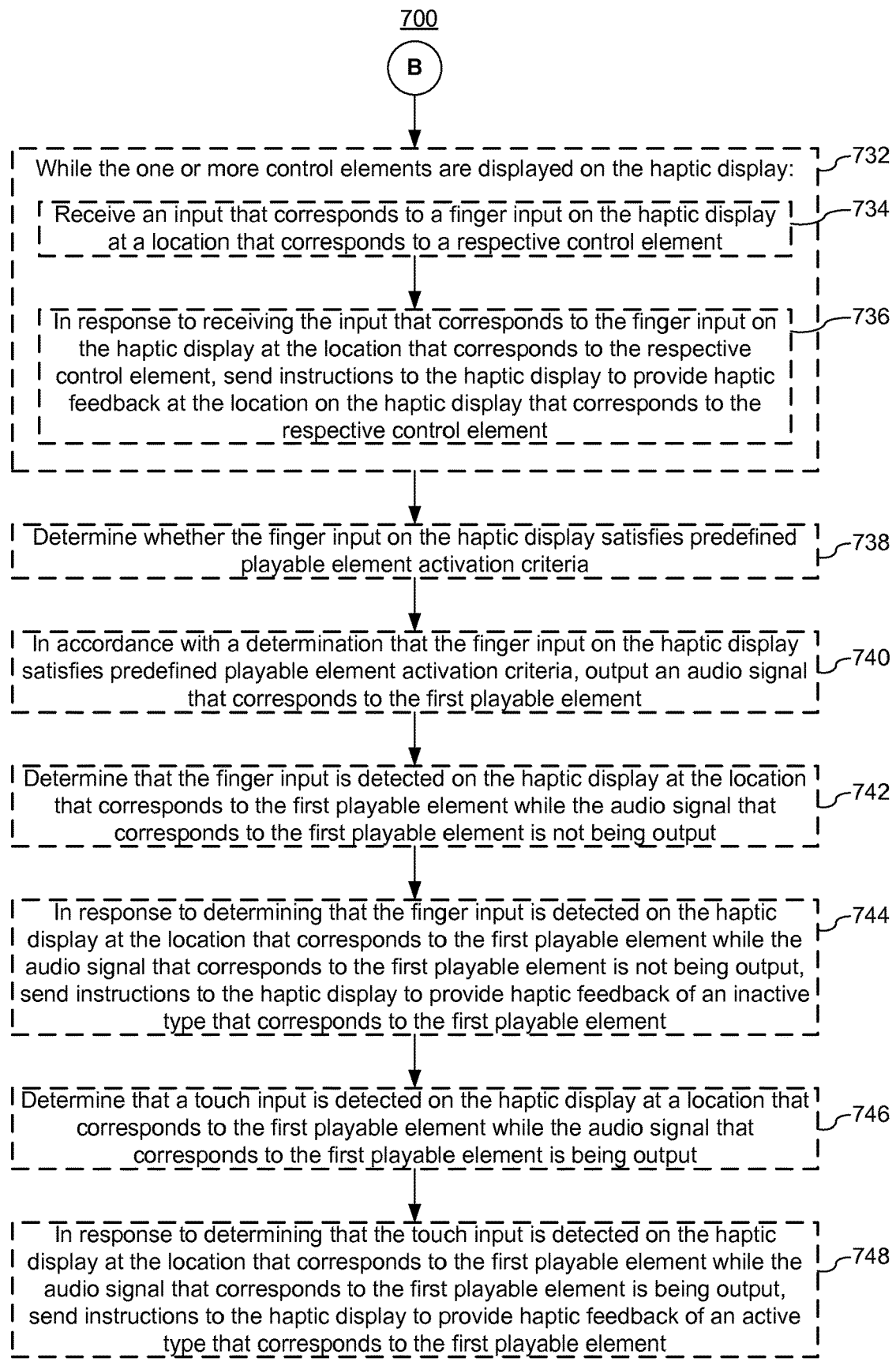

Below, FIGS. 5T-5Y illustrate exemplary user interfaces for presenting virtual musical instruments. FIGS. 7A-7C are flow diagrams illustrating a method of presenting virtual musical instruments. The user interfaces in FIGS. 5T-5Y are used to illustrate the processes in FIGS. 7A-7C.

Figure 8A:
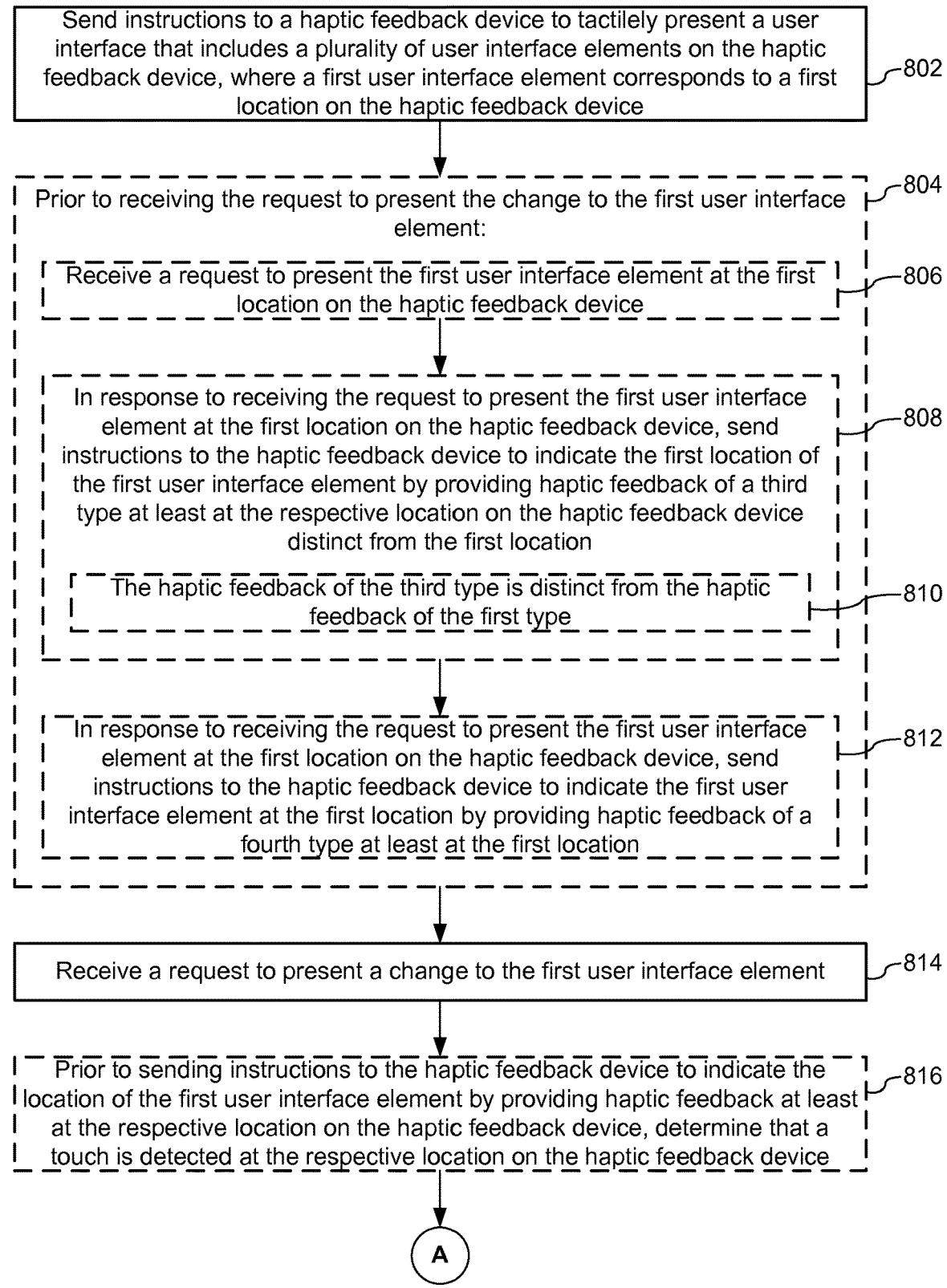
FIGS. 8A-8B are flow diagrams illustrating a method of presenting changes to user interface elements in accordance with some embodiments.
Figure 8B:
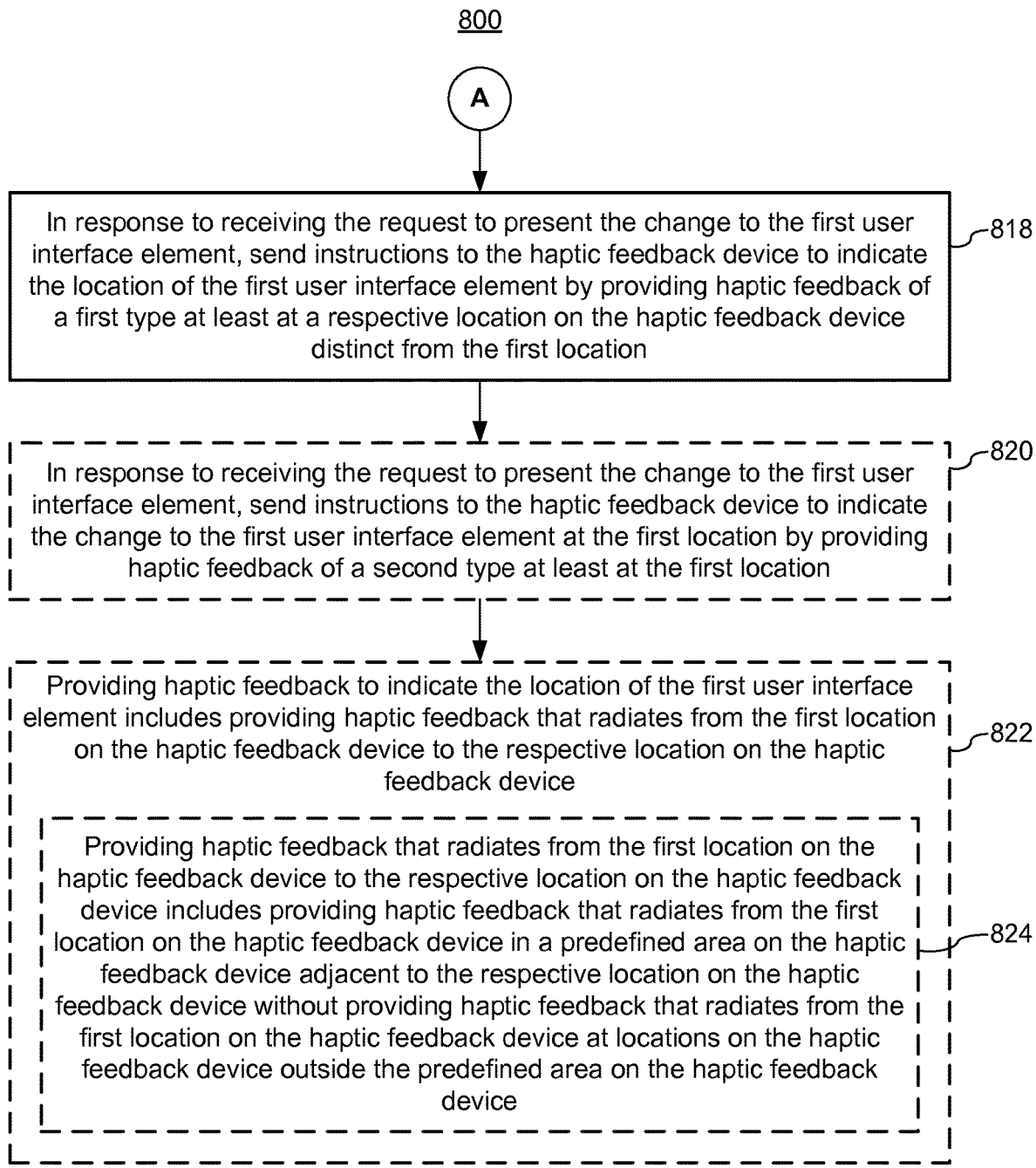

Below, FIGS. 5Z-5DD illustrate exemplary user interfaces for presenting changes to user interface elements. FIGS. 8A-8B are flow diagrams illustrating a method of presenting changes to user interface elements. The user interfaces in FIGS. 5Z-5DD are used to illustrate the processes in FIGS. 8A-8B.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a haptic display (or a haptic feedback device) and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
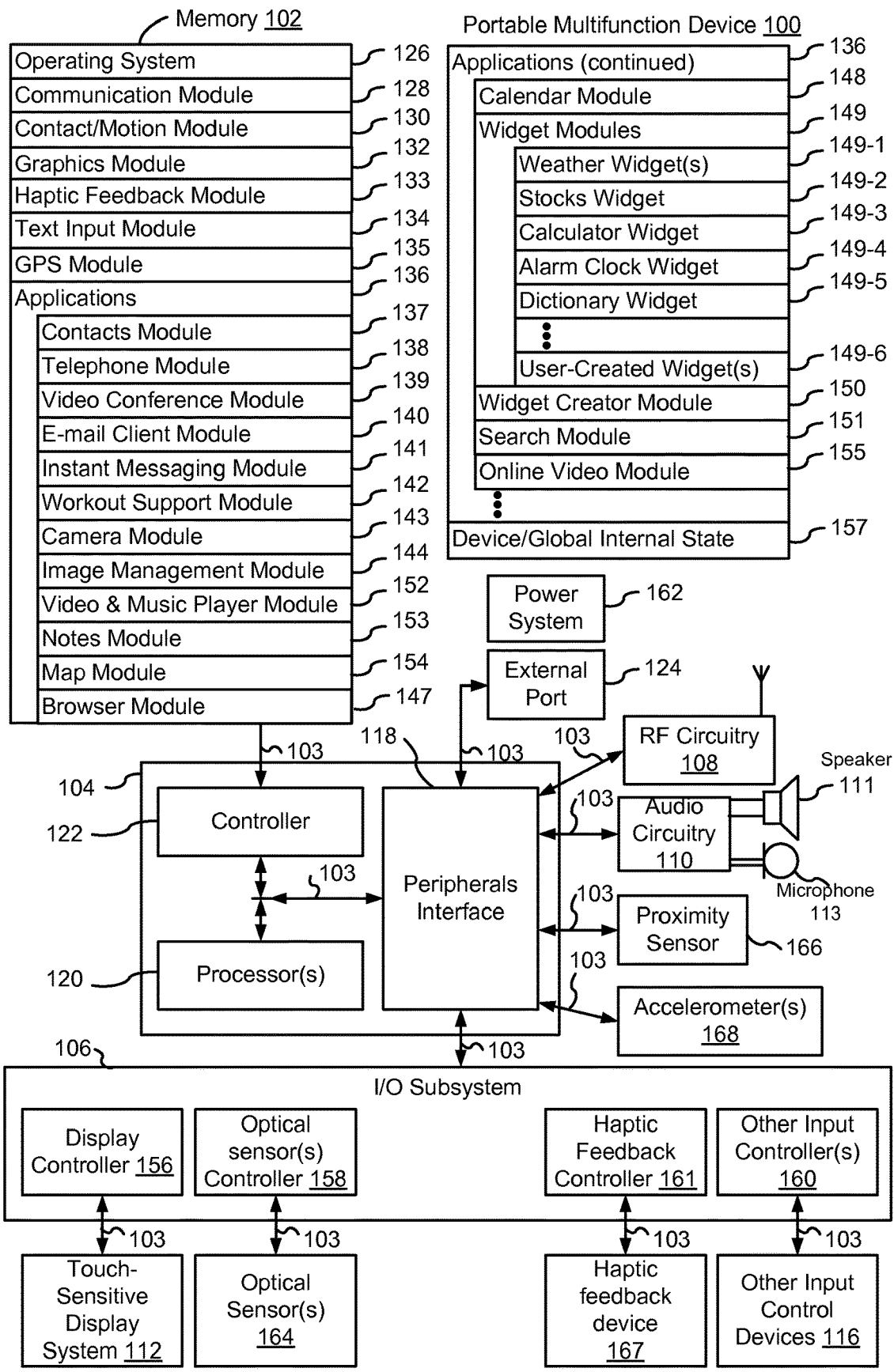
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more haptic feedback devices 167 for generating haptic feedback on device 100 (e.g., generating haptic feedback on a touch-sensitive surface such as touch-sensitive display system 112 of device 100 or touchpad 355 of device 300). These components optionally communicate over one or more communication buses or signal lines 103.

In some embodiments, touch-sensitive display 112 is a haptic display. For example, haptic feedback device 167 is integrated with a touch-sensitive surface, such as touch-sensitive display 112. As another example, a display integrated with haptic feedback device 167 includes a touch-sensitive surface.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more haptic feedback devices 167. FIG. 1A shows a haptic feedback device coupled to haptic feedback controller 161 in I/O subsystem 106. Haptic feedback device 167 optionally includes one or more electroacoustic devices such as speakers or other audio components and/or electromechanical devices that convert energy into linear motion such as a motor, solenoid, electroactive polymer, piezoelectric actuator, electrostatic actuator, electrostatic or electro-magnetic devices that can generate haptic sensations using electrical charges or electro-magnetic forces, or other haptic feedback generating component. Haptic feedback device 167 receives haptic feedback generation instructions from haptic feedback module 133 and generates haptic feedback on device 100 that are capable of being sensed by a user of device 100. In some embodiments, at least one haptic feedback device is collocated with, or proximate to, a touch-sensitive surface (e.g., touch-sensitive display system 112) and, optionally, generates a haptic feedback by moving the touch-sensitive surface vertically (e.g., in/out of a surface of device 100) or laterally (e.g., back and forth in the same plane as a surface of device 100). In some embodiments, at least one haptic feedback device is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
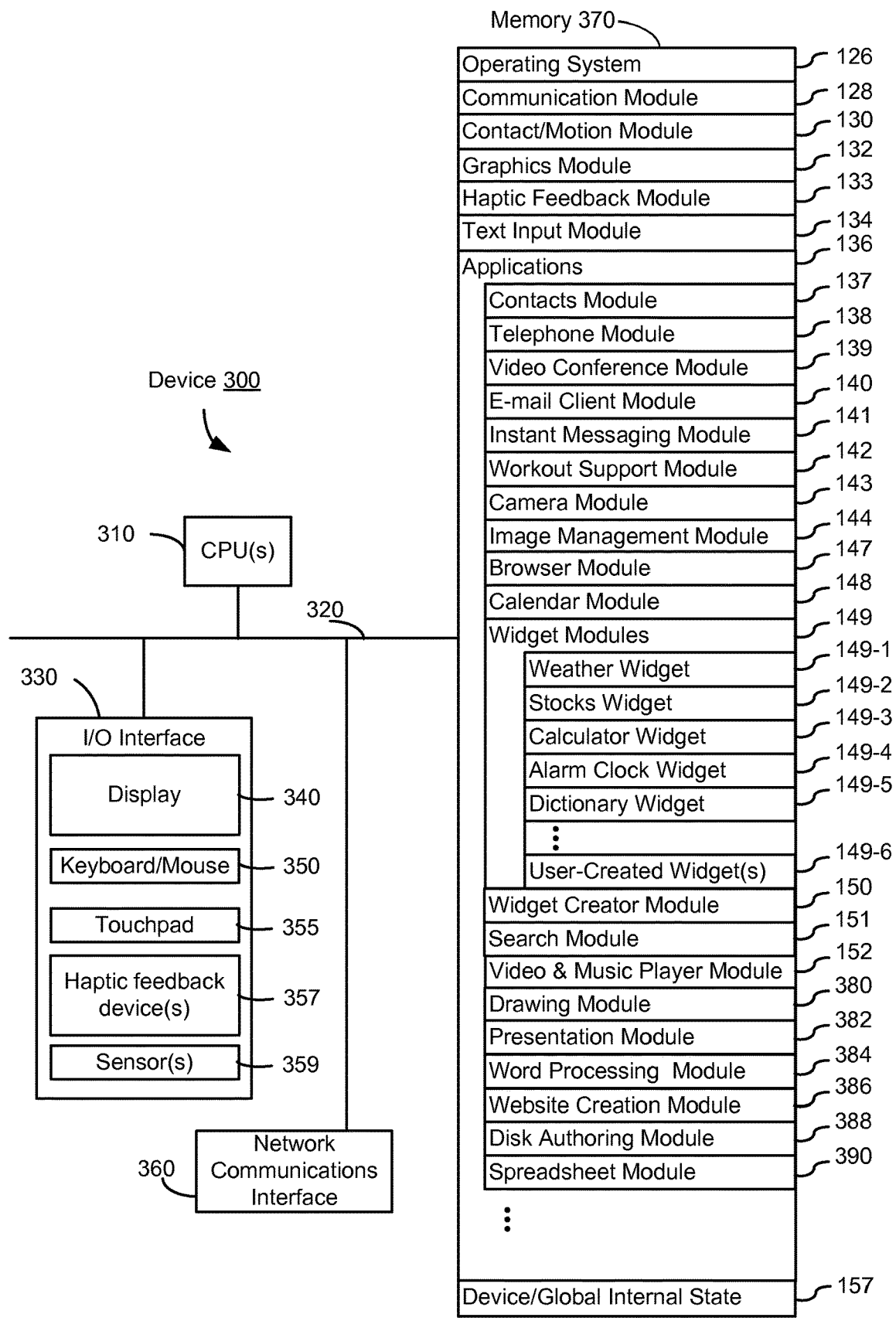
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by haptic feedback device(s) 167 to produce haptic feedback at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
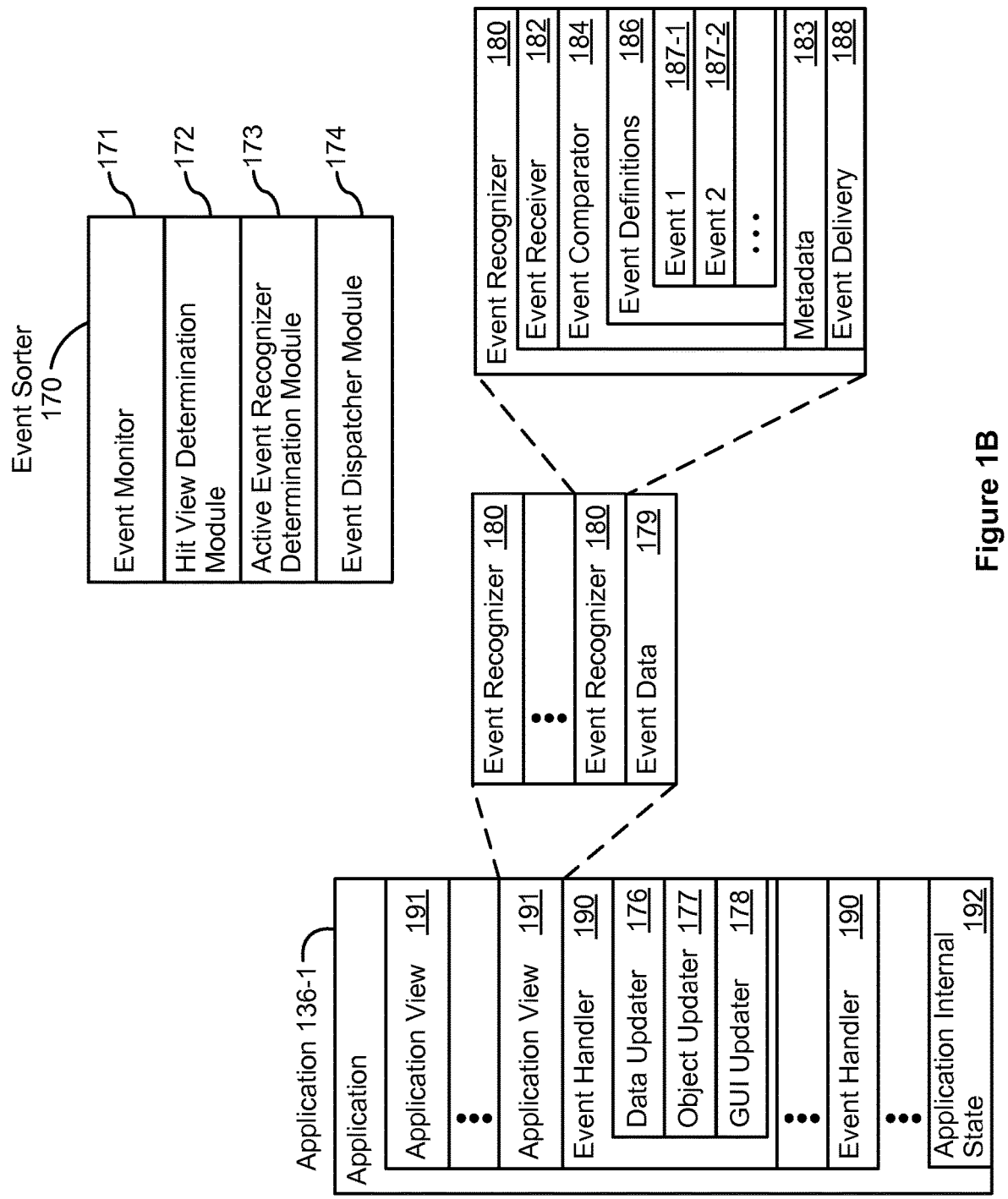
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
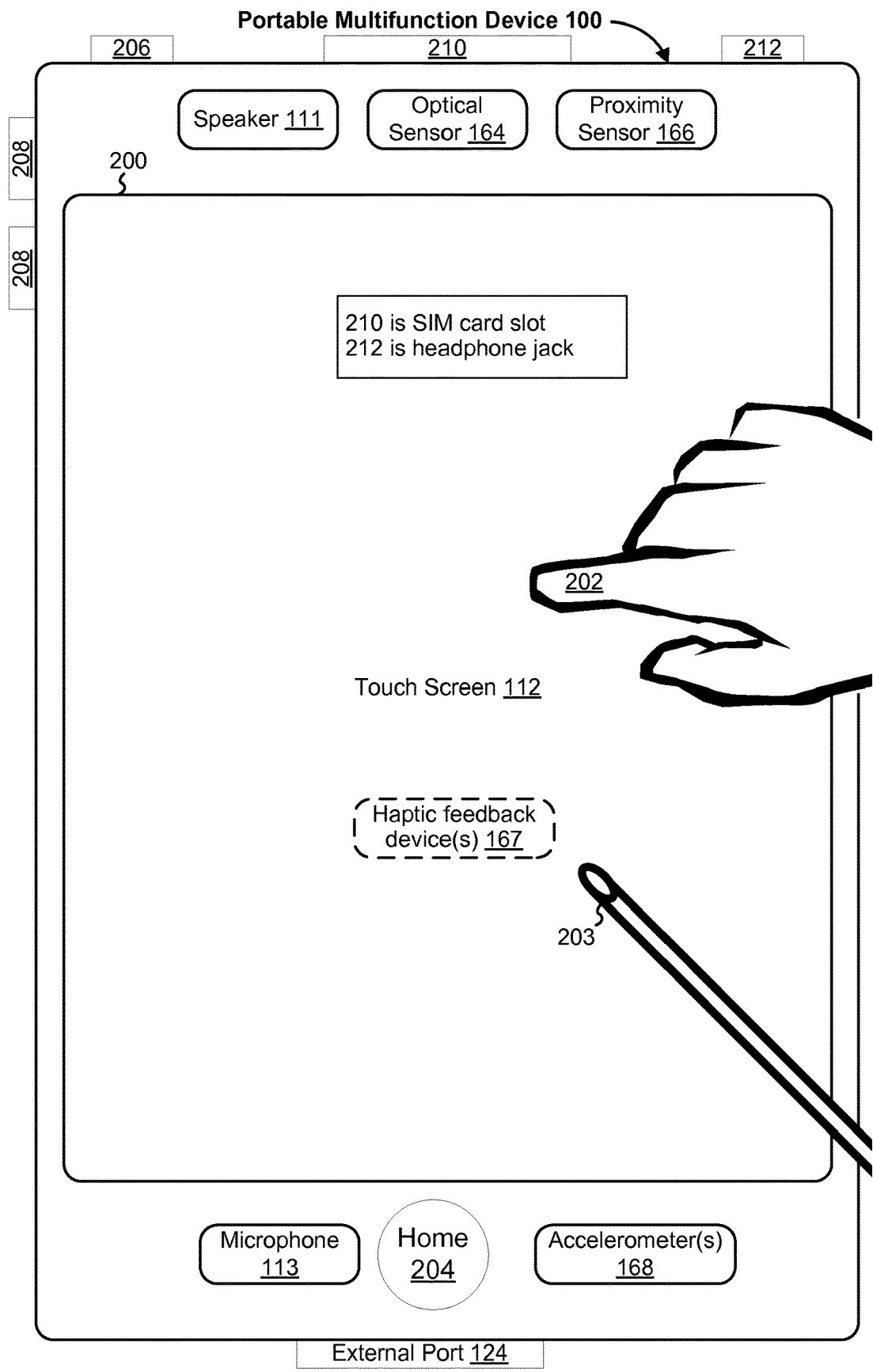
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more haptic feedback devices 167 for generating haptic feedback for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, haptic feedback device 357 for generating haptic feedback on device 300 (e.g., similar to haptic feedback device(s) 167 described above with reference to FIG. 1A), sensors 359 (e.g., optical, acceleration, proximity, and/or touch-sensitive). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
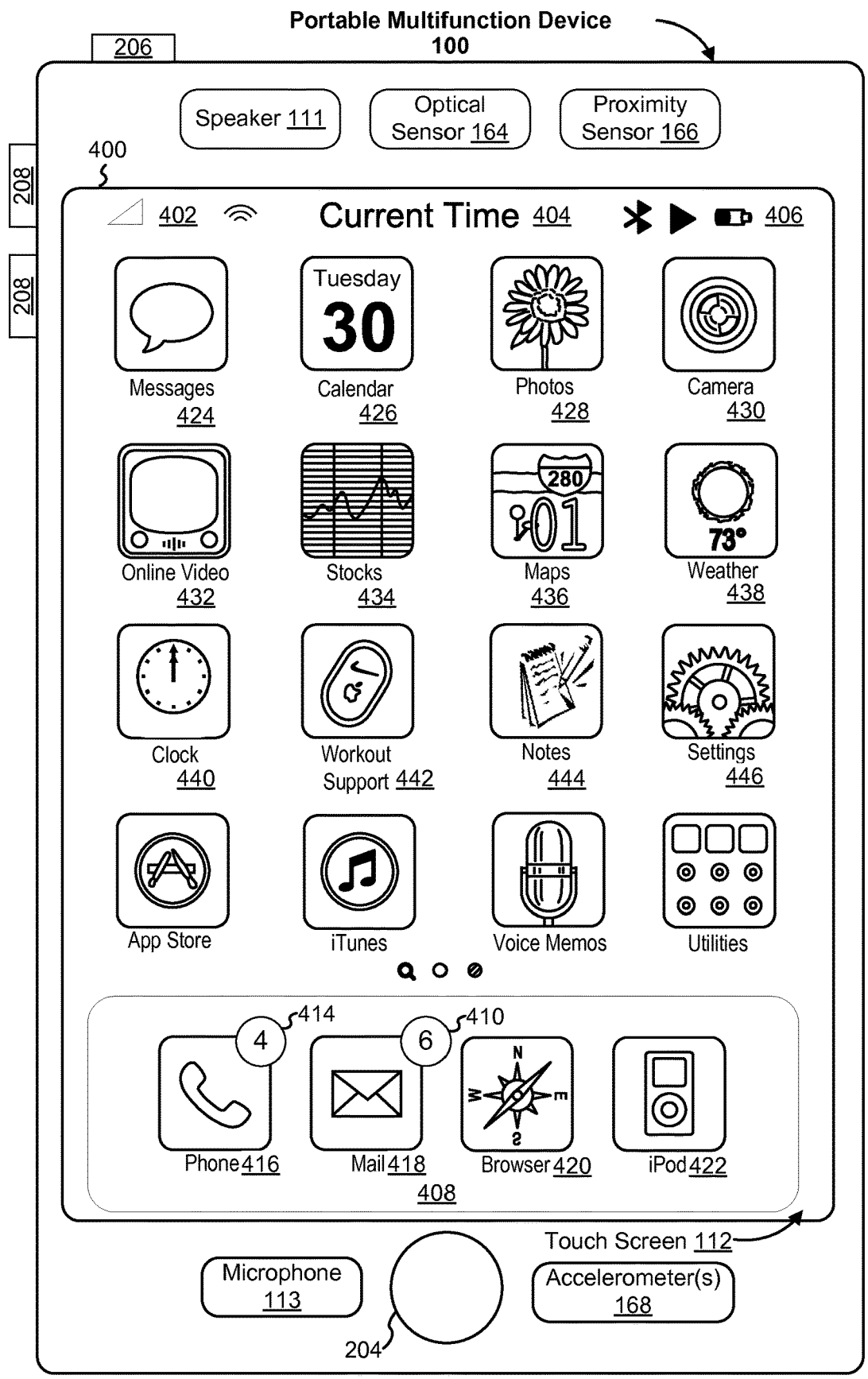
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
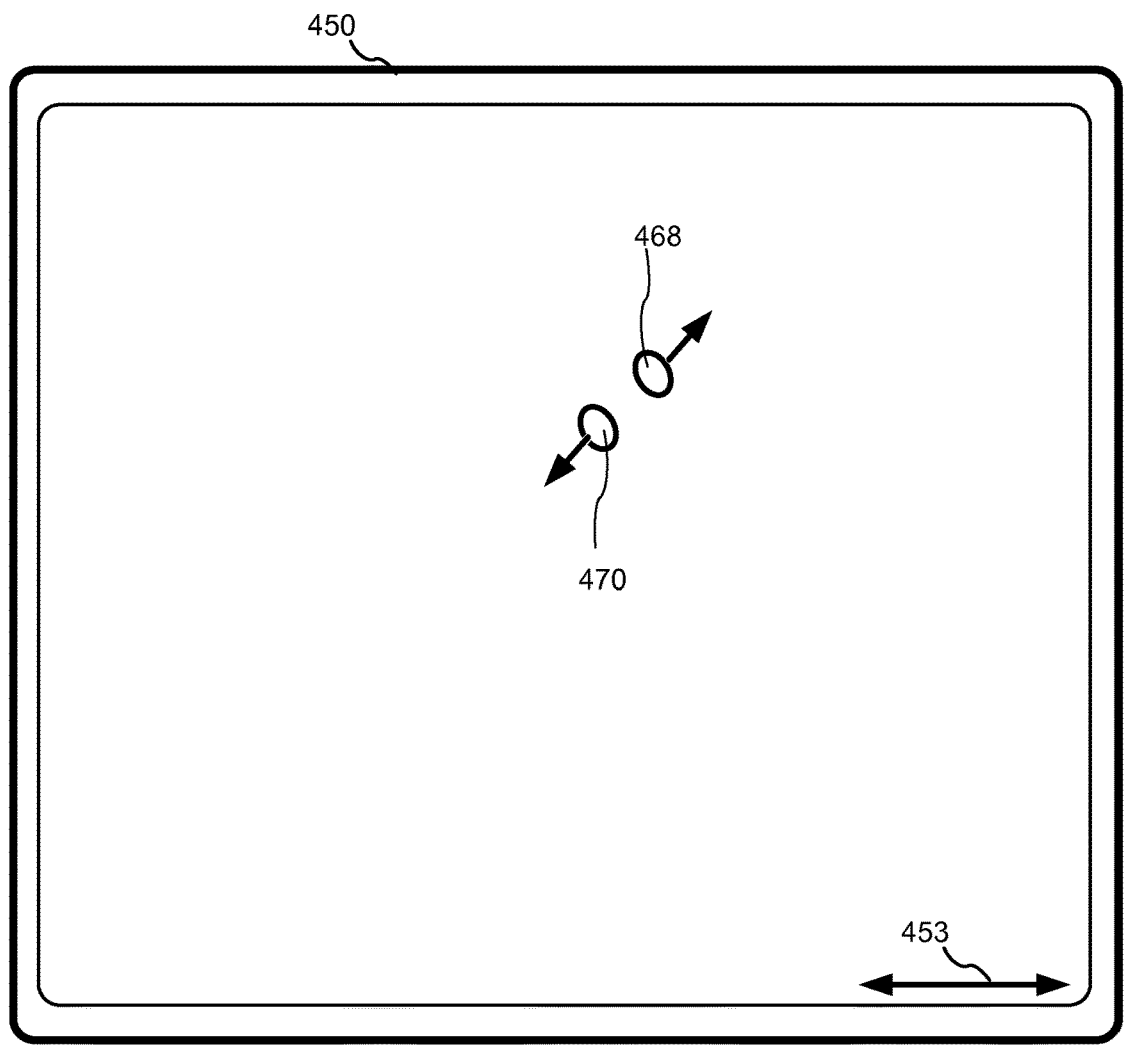
FIG. 4B illustrates an exemplary user interface for a multifunction device with a touch-sensitive surface that is separate from the display in accordance with some embodiments.
Figure 4B:
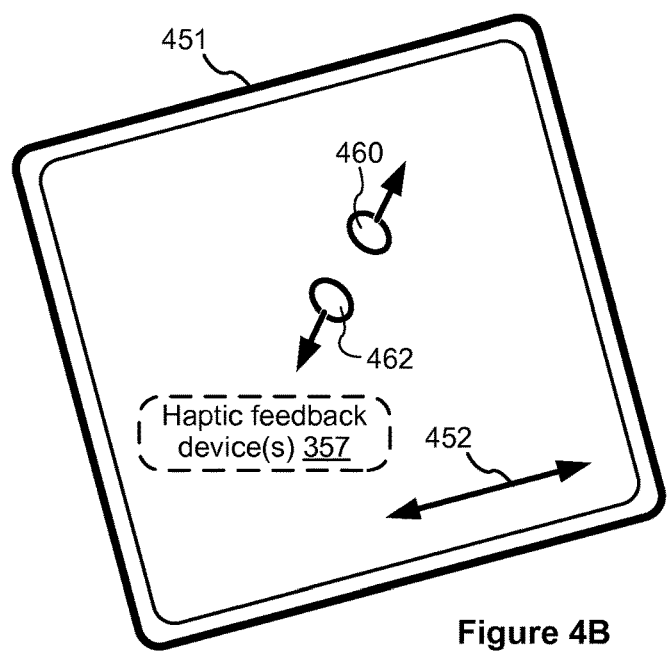

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more haptic feedback devices 359 for generating haptic feedback for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on an electronic device with a haptic display (or a haptic feedback device) and a touch-sensitive surface, such as device 300 or portable multifunction device 100.

Presenting Documents and Text

FIGS. 5A-5S illustrate exemplary user interfaces for presenting documents in accordance with some embodiments. The user interfaces in these figures are used to illustrate the processes described below, including the processes in FIGS. 6A-6B.

FIG. 5A illustrates user interface 5000 displayed on touch screen 112 of a device (e.g., device 100 or 300). In FIGS. 5A-5S, touch screen 112 is also a haptic display.

User interface 5000 is a user interface for presenting documents. In some embodiments, user interface 5000 corresponds to an application for presenting documents, such as a word processor application, a spreadsheet application, a presentation application, an e-reader or electronic book application, a text application, etc.

Document text 5002 is displayed in user interface 5000. Text 5002 includes a plurality of characters. The characters in text 5002 are displayed at a particular size (e.g., the font size) on touch screen 112, as shown in FIG. 5A. Document text 5002 constitutes at least a portion of a document.

While text 5002 is being displayed on touch screen 112, an input with finger contact 5004 is received (e.g., detected) at location 5004-*a* on touch screen 112. The input is, for example, a touch-and-hold gesture on touch screen 112. In response to receiving the input, the device associates cursor position 5006 with location 5004-*a*. In some embodiment, cursor position 5006 is displayed on touch screen 112 as a cursor. In some other embodiments, cursor position 5006 is not displayed on touch screen 112.

The device determines a character in text 5002 adjacent to cursor position 5006. As shown in FIG. 5A, cursor position 5006 is between the characters "t" and "h" in the word "this" over which contact 5004 is detected. In some embodiments, the device determines a character that is adjacent to and immediately comes before cursor position 5006 in the text. For example, the device determines the character "t" in the word "this" in FIG. 5A. In some other embodiments, the device determines a character that is adjacent to and immediately comes after cursor position 5006 in the text. For example, the device determines the character "h" in the word "this" in FIG. 5A. In the description below, it is assumed, for convenience and brevity, that the device determines the character that is adjacent to and comes before the cursor position. It should be appreciated, however, that the embodiments described below apply equally to determinations of characters that are adjacent to and come after the cursor position.

Figure 5B:
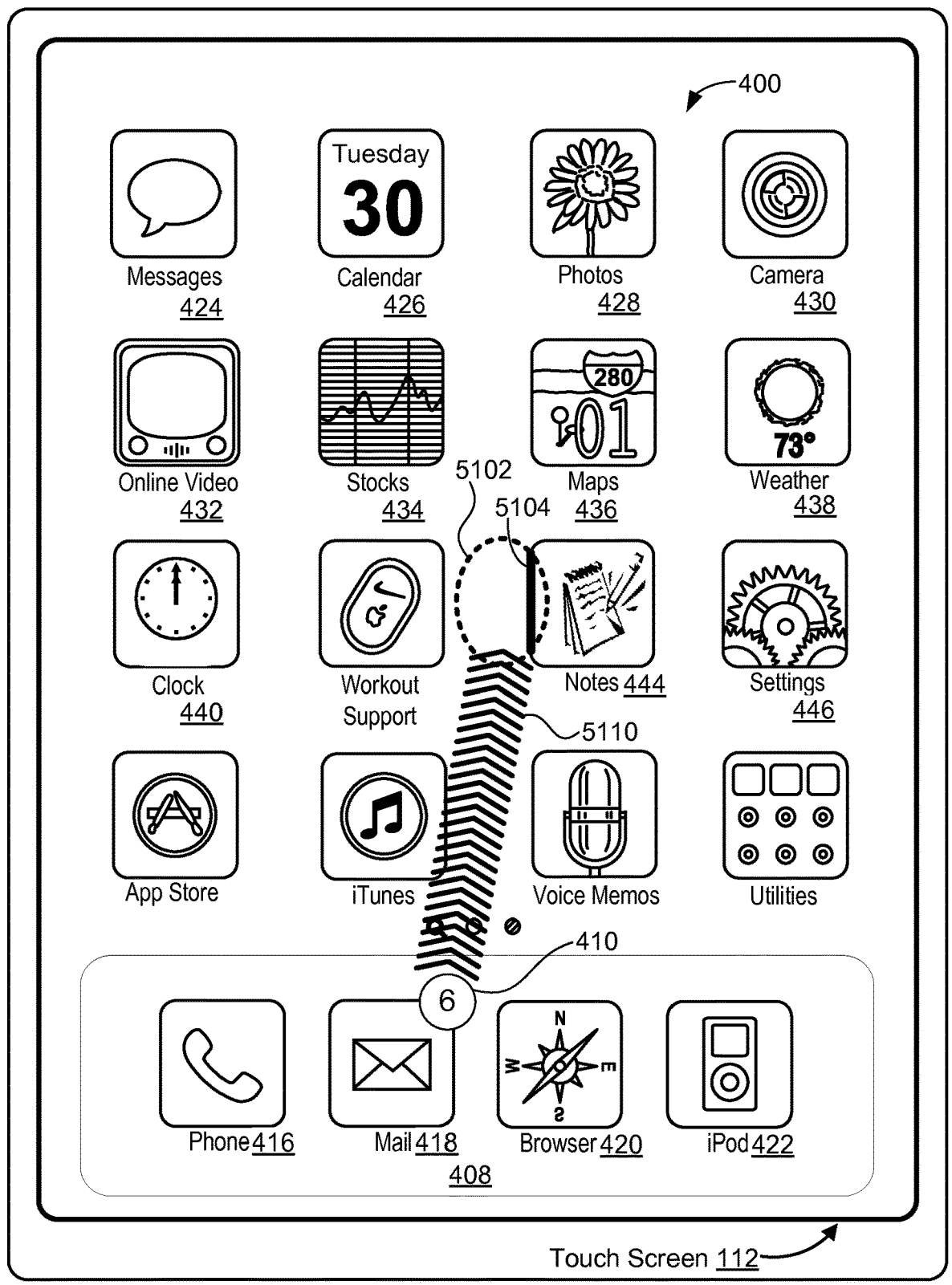

After determining the character "t" adjacent to cursor position 5006, the device sends instructions to touch screen 112 (e.g., through haptic feedback controller 161) to output the character "t" in Braille, as haptic feedback, on touch screen 112 at location 5004-*a*. As shown in FIG. 5B, touch screen 112 outputs Braille character 5010-1 for "t," at location 5004-*a*, at a size that is larger than the size of text 5002. It should be appreciated that Braille character 5010-1 is output as haptic feedback on touch screen 112 (that is also a haptic display) and visual display of Braille character 5010-1 (e.g., visual display of the cell of dots that forms Braille character 5010-1) is optional. In some embodiments, a user interface object (e.g., virtual loupe 5008) is displayed at location 5008-*a*, over location 5004-*a* of contact 5004. Touch screen 112 outputs Braille character 5010-1 inside virtual loupe 5008 as haptic feedback and, optionally, visual display.

Figure 5C:
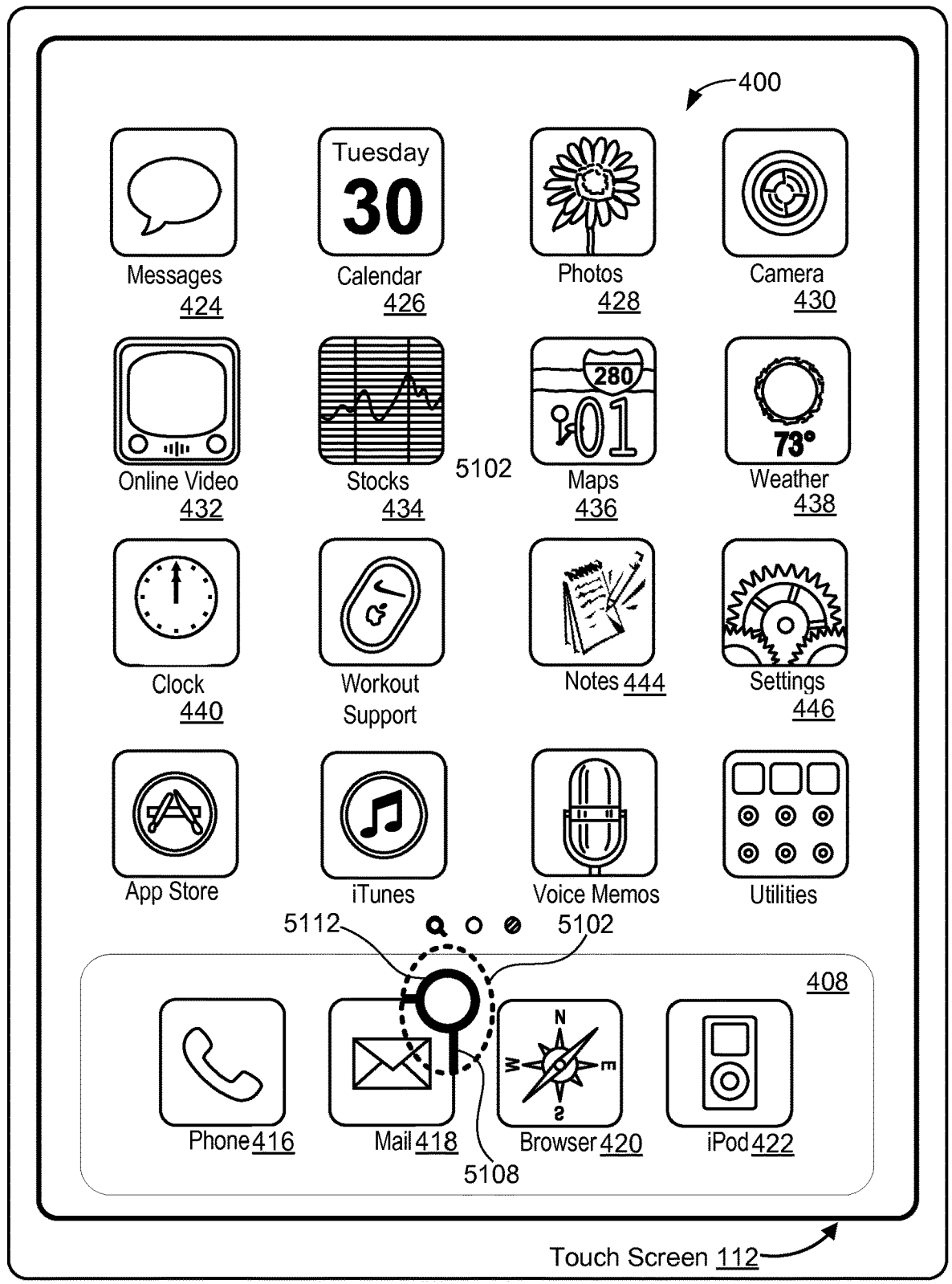

The device detects movement of contact 5004 on touch screen 112 in direction 5012. The movement of contact 5004 in direction 5012 moves contact 5004 rightward along the word "this," to location 5004-*b*, as shown in FIG. 5C. In accordance with the movement of contact 5004, the device associates a second cursor position with location 5004-*b*; the device moves (not shown) cursor position 5006 in accordance with the movement of contact 5004. For example, moving contact 5004 to location 5004-*b* moves cursor position 5006 by one character to the right, with the character "h" in "this" adjacent to and immediately before cursor position 5006. Virtual loupe 5008 also moves to location 5008-*b* in accordance with the movement of contact 5004. The device sends instructions to touch screen 112 (e.g., through haptic feedback controller 161) to output the character "h" in Braille, as haptic feedback, on touch screen 112 at location 5004-*b*. As shown in FIG. 5C, touch screen 112 outputs Braille character 5010-2 for "h," at location 5004-*b*, at a size that is larger than the size of text 5002.

As contact 5004 continues to move across text 5002, virtual loupe 5008 moves along and different characters are output within as haptic feedback in a manner analogous to those described above. For example, FIGS. 5C-5D shows contact 5004 moving, in direction 5012, to location 5004-*c*. Virtual loupe 5008 moves along, to location 5008-*c*. At location 5004-*c*, touch screen 112 outputs, inside virtual loupe 5008, Braille character 5010-3 for "i" in the word "this." FIGS. 5D-5E then shows contact 5004 moving, in direction 5014, to location 5004-*d*. Virtual loupe 5008 moves along, to location 5008-*d*. At location 5004-*d*, touch screen 112 outputs, inside virtual loupe 5008, Braille character 5010-4 for "g" in the word "might."

FIG. 5F illustrates an input with contact 5016 detected on touch screen 112 at location 5016-*a*, over the word "dedicated" in text 5002. The device associates cursor position 5017 with location 5016-*a*. The character "d" (more specifically, the second "d" in "dedicated) is adjacent to and immediately before cursor position 5017.

The device displays virtual loupe 5018 at location 5018-*a*, under contact 5004. Touch screen 112 outputs as haptic feedback inside virtual loupe 5008, Braille character 5020-1 for the second "d" in the word "dedicated," as shown in FIG. 5G. Braille character 5020-1 is displayed at a larger size than the size of the characters in text 5002.

Contact 5016 remains at location 5016-*a* (e.g., for at least a predefined period, such as 0.5 or 1 second). In response to determining that contact 5016 has remained at location 5016-*a*, the device instructs touch screen 112 to scroll multiple Braille characters in horizontal direction 5022, as shown in FIGS. 5H-5K. For example, Braille character 5020-1 scrolls in direction 5022 out of virtual loupe 5018, and haptic feedback Braille character 5020-2, for "i" in "dedicated," scrolls in direction 5022 into virtual loupe 5018. Then Braille character 5020-3, for "c" in "dedicated," scrolls in direction 5022 into virtual loupe 5018, and so on until contact 5016 moves or is lifted off touch screen 112.

The following described embodiments illustrate different possibilities regarding the association of a cursor position with the location of a contact. FIG. 5L illustrates an input with contact 5024 detected on touch screen 112 at location 5024-*a*, over the word "equal" in text 5002. The device associates a cursor position 5025 with location 5024-*a* such that the initial character of the word "equal," namely "e," is adjacent to and immediately before cursor position 5025. Touch screen 112 displays virtual loupe 5026 at location 5026-*a*, over location 5024-*a*. Touch screen 112 outputs as haptic feedback Braille character 5028 for "e" in "equal," inside virtual loupe 5026 at location 5024-*a*, as shown in FIG. 5M.

FIG. 5N illustrates an input with contact 5030 detected on touch screen 112 at location 5030-*a*, over the line "proposition that all men are created equal" in text 5002. The device associates a cursor position 5031 with location 5030-*a* such that the initial character of the line "proposition that all men are created equal," namely "p," is adjacent to and immediately before cursor position 5031. Touch screen 112 displays virtual loupe 5032 at location 5032-*a*, over location 5030-*a*. Touch screen 112 outputs as haptic feedback Braille character 5034 for the initial "p" in "proposition that all men are created equal," inside virtual loupe 5032 at location 5030-*a*, as shown in FIG. 5O.

FIG. 5P illustrates an input with contact 5036 detected on touch screen 112 at location 5036-*a*, over the sentence "Four score and seven years ago our fathers brought forth on this continent a new nation, conceived in liberty, and dedicated to the proposition that all men are created equal" in text 5002. The device associates a cursor position 5037 with location 5036-*a* such that the initial character of the sentence "Four score and seven years ago our fathers brought forth on this continent a new nation, conceived in liberty, and dedicated to the proposition that all men are created equal," namely "F," is adjacent to and immediately before cursor position 5037. Touch screen 112 displays virtual loupe 5038 at location 5038-*a*, over location 5036-*a*. Touch screen 112 outputs as haptic feedback Braille character 5040 for "F" in "Four score and seven years ago our fathers brought forth on this continent a new nation, conceived in liberty, and dedicated to the proposition that all men are created equal," inside virtual loupe 5038 at location 5036-a, as shown in FIG. 5Q. In some embodiments, a Braille formatting character is output before outputting Braille character 5040 to indicate that the "F" to which Braille character 5040 corresponds is capitalized.

FIG. 5R illustrates document 5042 with table 5044 displayed in user interface 5000. Table 5044 includes multiple cells 5046. An input with contact 5048 is detected on touch screen 112 at location 5048-a, over cell 5046-8. Cell 5046-8 includes the text "Gold." The device associates a cursor position 5050 with location 5048-a such that the initial character of the text "Gold" in cell 5046-8, namely "G," is adjacent to and immediately before cursor position 5050. Touch screen 112 displays virtual loupe 5052 at location 5052-a, over location 5048-a. Touch screen 112 outputs as haptic feedback Braille character 5054 for "G" in "Gold," inside virtual loupe 5052 at location 5048-a, as shown in FIG. 5S.

In some embodiments, when touch screen 112 outputs a Braille character (e.g., Braille character 5010, 5020, 5028, 5034, 5040, or 5048), the device outputs an audio signal corresponding to the output Braille character. For example, in FIG. 5B, when touch screen 112 outputs Braille character 5010-1 for "t," the device outputs an audio signal (not shown) that spells out the character "t"; the device spells out the output Braille characters or reads the text corresponding to the output Braille characters.

Presenting Virtual Musical Instruments

FIGS. 5T-5Y illustrate exemplary user interfaces for presenting virtual musical instruments in accordance with some embodiments. The user interfaces in these figures are used to illustrate the processes described below, including the processes in FIGS. 7A-7C.

FIG. 5T illustrates virtual guitar user interface 5060 displayed on touch screen 112 of a device (e.g., device 100 or 300). In FIGS. 5T-5Y, touch screen 112 is also a haptic display.

Virtual guitar user interface 5060 includes virtual fretboard (also called "fingerboard") 5062 with multiple virtual guitar strings 5064. Virtual strings 5064 (e.g., virtual strings 5064-1 thru 5064-4, as shown) correspond to guitar strings of varying gauge on a physical guitar. Virtual guitar user interface 5060 also includes virtual switch 5066.

An input with contact 5068 is detected on touch screen 112 over virtual string 5064-4. In response to receiving the input, touch screen 112 outputs haptic feedback 5070 that tactilely conveys the feel of a physical string corresponding to virtual string 5064-4, including, for example, the texture and gauge of the corresponding physical string.

Thus, if an input (e.g., an input contact 5072) is detected over a different virtual string (e.g., virtual string 5064-1), the haptic feedback 5074 (FIG. 5U) that is output in response receipt of the input is distinct form (e.g., feels different than, to the user) haptic feedback 5070, as the physical string corresponding to virtual string 5064-1 is different from the physical string corresponding to virtual string 5064-4. For example, the two physical strings have different gauges, and haptic feedback 5070 and 5074 conveys the different gauges.

FIG. 5V illustrates an input with contact 5076 detected over virtual switch 5066. In response to receiving the input, touch screen 112 outputs haptic feedback 5078 that tactilely conveys the feel of a physical switch corresponding to virtual switch 5066.

FIGS. 5W-5Y illustrate a virtual keyboard (e.g., piano) interface 5080 with multiple virtual white (e.g., ivory) keys 5082 and multiple virtual black (e.g., ebony) keys 5084. In FIG. 5W, an input with contact 5086 is detected over virtual black key 5084-1. In response to receiving the input, touch screen 112 output haptic feedback 5088 that conveys the feel of a physical black key corresponding to virtual black key 5084-1 (e.g., haptic feedback that conveys the feel of an ebony key).

In FIG. 5X, an input with contact 5090 is detected over virtual white key 5082-1. In response to receiving the input, touch screen 112 output haptic feedback 5092 that conveys the feel of a physical white key corresponding to virtual white key 5082-1 (e.g., haptic feedback that conveys the feel of an ivory key).

In some embodiments, the haptic feedback conveyed for the same virtual key (or virtual string or other playable element on a virtual musical instrument interface) is different depending on whether the input triggering the haptic feedback activated playing of the virtual key. For example, in FIG. 5X, the input with contact 5090 did not activate playing of virtual white key 5082-1, whereas in FIG. 5Y, the input with contact 5093 does activate playing of virtual white key 5082-1 (e.g., the input with contact 5090 is a hover of contact 5090 over virtual white key 5082-1, whereas the input with contact 5093 is a tap gesture on virtual white key 5082-1). In response to receiving the input with contact 5093, the device outputs an audio signal (not shown) corresponding to virtual white key 5082-1 (e.g., the note corresponding to virtual white key 5082-1) and touch screen 112 outputs haptic feedback 5094 that is distinct from the haptic feedback 5092 that is output when playing of virtual white key 5082-1 is not activated.

Presenting Changes to User Interface Elements

Figure 5D:
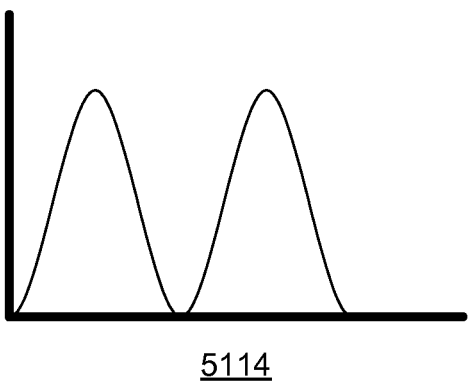
Figure 5D:
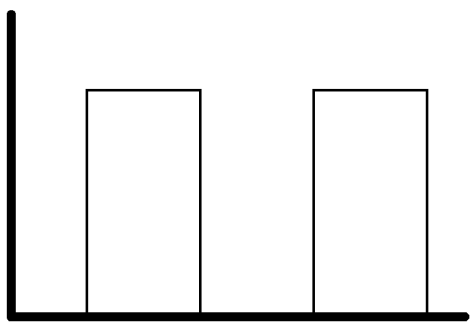
Figure 5D:
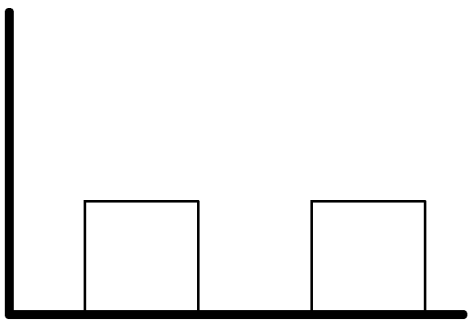
Figure 5D:
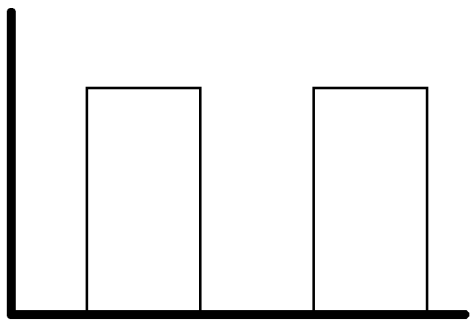

FIGS. 5Z-5DD illustrate exemplary user interfaces for presenting changes to user interface elements in accordance with some embodiments. The user interfaces in these figures are used to illustrate the processes described below, including the processes in FIGS. 8A-8B.

FIG. 5Z illustrates user interface 400 displayed on touch screen 112 of a device (e.g., device 100 or 300). In FIGS. 5Z-5CC, the device includes a haptic feedback device integrated with a touch-sensitive surface (e.g., touch screen 112 is also a haptic display). User interface 400 includes, for example, icon 444 and icon 418.

The device detects contact 5102 on touch screen 112. Contact 5102 intersects the boundary of icon 444. Touch screen 112 outputs haptic feedback 5104 that conveys the boundary of icon 444.

Touch screen 112 also outputs haptic feedback 5106. Haptic feedback 5106 is a haptic feedback (e.g., a ripple, a wave) that moves from icon 418 toward contact 5102. Haptic feedback 5106 is width-limited and directed toward contact 5102, not rippled across the entire touch screen 112. Haptic feedback 5106 indicates the location of icon 418; location of icon 418 can be determined from the direction of movement of haptic feedback 5106.

Based on the location of icon 418 determined from haptic feedback 5106, the user can move contact 5102 to the location of icon 418. For example, FIG. 5AA illustrates the device detecting contact 5102 at a location that intersects the boundary of icon 418. Touch screen 112 outputs haptic feedback 5108 that conveys the boundary of icon 418.

Returning to the example shown in FIG. 5Z, the device changes icon 418 to include badge 410 (e.g., icon 418 corresponds to a mail application and badge 410 indicates newly received mail on the device), as shown in FIG. 5BB. In response to the change to icon 418, touch screen 112 outputs haptic feedback 5110. Haptic feedback 5110 is a haptic feedback (e.g., a ripple, a wave) that moves from icon 418 (or badge 410) toward contact 5102. Haptic feedback 5110 indicates the location of changed icon 418; the location of changed icon 418 can be determined from the direction of movement of haptic feedback 5110. Haptic feedback 5110 is width-limited and directed toward contact 5102, not rippled across the entire touch screen 112. Haptic feedback 5110 is distinct from haptic feedback 5106 (e.g., different pattern, different amplitude, different frequency).

Based on the location of changed icon 418 determined from haptic feedback 5110, the user can move contact 5102 to the location of changed icon 418. For example, FIG. 5CC illustrates the device detecting contact 5102 at a location that intersects the boundary of icon 418 and badge 510. Touch screen 112 outputs haptic feedback 5108 that conveys the boundary of icon 418 and haptic feedback 5112 that conveys the boundary of badge 410.

As described above, haptic feedback 5106 and haptic feedback 5110 are distinct. FIG. 5DD illustrates examples of differences between the two haptic feedbacks. For example, in FIG. 5DD, graph 5114 corresponds to one of the two haptic feedbacks, say haptic feedback 5106, and graph 5116 corresponds to haptic feedback 5110. Graph 5114 is a sinusoidal wave, and graph 5116 is a square wave. Thus, a possible difference between haptic feedback 5106 and haptic feedback 5110 is in the pattern.

As another example, graph 5118 corresponds to one of the two haptic feedbacks, say haptic feedback 5106, and graph 5120 corresponds to haptic feedback 5110. Graphs 5118 and 5120 are both square waves, but have different amplitudes. Thus, another possible difference between haptic feedback 5106 and haptic feedback 5110 is in the amplitude. Other differences, such as frequency, are possible.

FIGS. 6A-6B are flow diagrams illustrating a method 600 of presenting documents in accordance with some embodiments. The method 600 is performed at an electronic device (e.g., device 300, FIG. 3, or portable multifunction device 100, FIG. 1) in communication with a haptic display that includes a touch-sensitive surface. In some embodiments, the haptic display is a touch screen display and the touch-sensitive surface is on the haptic display. In some embodiments, the haptic display is separate from the touch-sensitive surface. In some embodiments, the haptic display includes a haptic feedback device (e.g., refreshable Braille display) integrated with a display (e.g., a liquid-crystal-display screen). Some operations in method 600 may be combined and/or the order of some operations may be changed.

As described below, the method 600 provides an intuitive way to present documents. The method reduces the cognitive burden on a user when reading documents, thereby creating a more efficient human-machine interface. For battery-operated electronic devices, enabling a user to read documents faster and more efficiently conserves power and increases the time between battery charges.

The device sends (602) instructions to the haptic display to display at least a portion of a document that includes a plurality of characters, where a respective character is displayed at a respective displayed character size on the haptic display. FIG. 5A, for example, shows touch screen 112 displaying text 5002 in accordance with instructions sent by the device. The characters in text 5002 are displayed in some size.

While the haptic display is displaying at least the portion of the document, the device receives (604) an input that corresponds to a finger contact at a first location on the haptic display. For example, in FIG. 5A, the device receives an input with contact 5004 on touch screen 112 while text 5002 is being displayed.

In response to receiving (606) the input that corresponds to the finger contact at the first location on the haptic display, the device associates (608) a first cursor position with the first location on the haptic display (e.g., assigning the first cursor position to the first location), determines (618) a first character in the plurality of characters adjacent to (at or immediately next to) the first cursor position, and sends (620) instructions to the haptic display to output a Braille character, at the first location on the haptic display, that corresponds to the first character, where a respective Braille character is output on the haptic display at a respective Braille character size, the respective Braille character size being larger than the corresponding displayed character size. In some embodiments, the first cursor position is displayed on the haptic display. In some embodiments, the first cursor position is not displayed on the haptic display.

For example, in response to receiving the input with contact 5004, the device associates cursor position 5006 with location 5004-a of contact 5004, determines the character "t" adjacent to cursor position 5006, and sends instructions to touch screen 112 to output Braille character 5010-1 for "t" at location 5004-a. Braille character 5010-1 is output at a size that is larger than the display size of the corresponding character "t" in text 5002.

In some embodiments, the first location corresponds (610) to a word displayed on the haptic display, and the first cursor position corresponds to an initial character of the word. In other words, in this embodiment, the first character is the initial character of the word. For example, FIG. 5L shows an input with contact 5024 detected at location 5024-a over the word "equal." Cursor position 5025 corresponds to the initial character "e" in the word, and Braille character 5028 for "e" is output (FIG. 5M).

In some embodiments, the first location corresponds (612) to a line of text displayed on the haptic display, and the first cursor position corresponds to an initial character of the line of text. In other words, in this embodiment, the first character is the initial character of the line of text. For example, FIG. 5N shows an input with contact 5030 detected at location 5030-a over the line "proposition that all men are created equal." Cursor position 5031 corresponds to the initial character "p" in the line of text, and Braille character 5034 for "p" is output (FIG. 5O).

In some embodiments, the first location corresponds (614) to a sentence of the document, and the first cursor position corresponds to an initial character of the sentence. In other words, in this embodiment, the first character is the initial character of the respective sentence. For example, FIG. 5P shows an input with contact 5036 detected at location 5036-a over the sentence "Four score and seven years ago our fathers brought forth on this continent a new nation, conceived in liberty, and dedicated to the proposition that all men are created equal." Cursor position 5037 corresponds to the initial character "F" in the sentence, and Braille character 5040 for "F" is output (FIG. 5Q).

In some embodiments, the first location corresponds (616) to a respective user interface element of the document, and the first cursor position corresponds to an initial character of a text that corresponds to the respective user interface element. For example, the respective user interface element is a button with a text "ACCEPT" over the button. In another example, the respective user interface element is a table cell with text within the table cell. In other words, in this embodiment, the first character is the initial character of the text that corresponds to the respective user interface element. For example, FIG. 5R shows an input with contact 5048 detected at location 5048-*a* over cell 5046-8 in table 5044. Cell 5046-8 includes the text "Gold" Cursor position 5050 corresponds to the initial character "G" in the word "Gold," and Braille character 5054 for "G" is output (FIG. 5S).

In some embodiments, the device determines (622) that the finger contact remains at the first location on the haptic display (e.g., the finger contact is maintained at the first location for at least a predefined period, such as 0.2, 0.5 or 1.0 seconds). In response to determining that the finger contact remains at the first location on the haptic display, the device sends (624) instructions to the haptic display to horizontally scroll multiple Braille characters, at the first location on the haptic display, that correspond to displayed characters following the first character in the plurality of characters. For example, FIGS. 5F-5K illustrates contact 5016 remaining at location 5016-*a* on touch screen 112. Cursor position 5017 is associated with the second "d" in "dedicated." In response, the device sends instructions to touch screen 112 to scroll Braille characters 5020-1 thru 5020-3 at location 5016-*a* in horizontal direction 5022. Braille characters 5020-1 thru 5020-3 correspond to the second "d" and two following characters in the word "dedicated."

In some embodiments, after sending instructions to the haptic display to output a Braille character that corresponds to the first character, the device determines (626) that the finger contact has moved across the haptic display to a second location. In accordance with the determination (628) that the finger contact has moved across the haptic display to the second location on the haptic display, the device associates (630) a second cursor position with the second location on the haptic display, determines (632) a second character in the plurality of characters adjacent to (at or immediately next to) the second cursor position, and sends (634) instructions to the haptic display to output a Braille character that corresponds to the second character, at a Braille character size that is larger than the corresponding displayed character size of the second character, at the second location on the haptic display. In some embodiments, the second character is adjacent to the first character in the plurality of characters. For example, the second character is immediately after the first character in the plurality of characters. Alternatively, in some embodiments, the second character is not adjacent to the first character in the plurality of characters. For example, one or more characters are located between the first character and the second character in the plurality of characters. In some embodiments, in accordance with the determination that the finger contact has moved across the haptic display to the second location on the haptic display, the electronic device sends instructions to the haptic display to forego outputting the Braille character that corresponds to the first character at the first location.

For example, FIGS. 5B-5E illustrate contact 5004 moving, on touch screen 112, across text 5002. As contact 5004 moves, cursor position 5006 is associated with the new locations of contact 5004; cursor position 5006 moves with contact 5004. Braille characters 5010-2 thru 5010-4 are output at locations 5004-*b* thru 5004-*d*, respectively, in accordance with the changing position of cursor position 5006. Braille characters 5010-2 thru 5010-4 are also output at a larger size than the corresponding characters in text 5002 are displayed.

In some embodiments, the device outputs (636) audio signals that correspond to one or more Braille characters output by the haptic display. In some embodiments, when a word or sentence is output by the haptic display, the electronic device outputs audio signals that correspond to the word or sentence. For example, when the haptic display outputs Braille characters that correspond to a word "cat," the electronic device outputs a voice that speaks the word "cat." Alternatively, the electronic device outputs a voice that spells "c-a-t." In some embodiments, the electronic device foregoes outputting audio signals that correspond to one or more Braille characters output by the haptic display.

For example, in FIG. 5B, when outputting Braille character 5010-1, the device, optionally, audibly spells out "t" corresponding to Braille character 5010-1.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 700 and 800 (e.g., FIGS. 7A-7C and 8A-8B respectively) are also applicable in an analogous manner to method 600 described above with respect to FIGS. 6A-6B. For example, the inputs and contacts described above with reference to method 600 may have one or more of the characteristics of the contacts described herein with reference to methods 700 and 800. For brevity, these details are not repeated here.

FIGS. 7A-7C are flow diagrams illustrating a method 700 of presenting virtual musical instruments in accordance with some embodiments. The method 700 is performed at an electronic device (e.g., device 300, FIG. 3, or portable multifunction device 100, FIG. 1) in communication with a haptic display that includes a touch-sensitive surface. In some embodiments, the haptic display is a touch screen display and the touch-sensitive surface is on the haptic display. In some embodiments, the haptic display is separate from the touch-sensitive surface. In some embodiments, the haptic display includes a haptic feedback device (e.g., refreshable Braille display) integrated with a display (e.g., a liquid-crystal-display screen). Some operations in method 700 may be combined and/or the order of some operations may be changed.

As described below, the method 700 provides an intuitive way to present virtual musical instruments. The method reduces the cognitive burden on a user when using virtual musical instruments, thereby creating a more efficient human-machine interface. For battery-operated electronic devices, enabling a user to use virtual musical instruments faster and more efficiently conserves power and increases the time between battery charges.

The device sends (702) instructions to the haptic display to display a plurality of playable elements of one or more musical instruments (e.g., strings, keys). For example, FIG. 5T shows virtual strings 5064 displayed on touch screen 112. FIG. 5W shows virtual keys 5082 and 5084 displayed on touch screen 112.

While the plurality of playable elements is displayed (704) on the haptic display, the device receives (706) an input that corresponds to a finger input on the haptic display at a location that corresponds to a first playable element. In response to receiving an input that corresponds to the finger input on the haptic display at the location that corresponds to the first playable element, the device sends (708) instructions to the haptic display to provide haptic feedback that corresponds to the first playable element. In some embodiments, the haptic feedback is provided at the location that corresponds to the first playable element. For example, in FIG. 5T, in response to receiving the input with contact 5068 over virtual string 5064-4, the device instructs touch screen 112 to output haptic feedback 5070 corresponding to virtual string 5064-4.

In some embodiments, the plurality of playable elements includes one or more strings of a string instrument (710). For example, FIG. 5T shows virtual guitar strings 5064-1 thru 5064-4 displayed on touch screen 112.

In some embodiments, the plurality of playable elements includes at least a first string and a second string (712). The device determines (714) whether the finger input on the haptic display occurs at a location that corresponds to the first string or at a location that corresponds to the second string. In response to determining that the finger input on the haptic display occurs at the location that corresponds to the first string, the device sends (716) instructions to the haptic display to provide haptic feedback of a first type at a location on the haptic display that corresponds to the first string (e.g., haptic feedback that corresponds to a string of a first gauge). In response to determining that the finger input on the haptic display occurs at the location that corresponds to the second string, the device sends (718) instructions to the haptic display to provide haptic feedback of a second type at a location on the haptic display that corresponds to the second string (e.g., haptic feedback that corresponds to a string of a second gauge). In some embodiments, the haptic feedback of the second type is distinct from the haptic feedback of the first type. For example, haptic feedback 5070 (FIG. 5T) for contact 5068 over virtual string 5064-4 is different from haptic feedback 5074 (FIG. 5U) for contact 5072 over virtual string 5064-1.

In some embodiments, the plurality of playable elements includes one or more keys of a keyboard instrument (720). For example, FIG. 5W shows virtual keys 5082 and 5084 displayed on touch screen 112.

In some embodiments, the plurality of playable elements includes two or more keys of a first type, including a first key, and two or more keys of a second type, including a second key (722). In some embodiments, the two or more keys of the first type include two or more ivory keys. In some embodiments, the two or more keys of the second type include two or more ebony keys. The device determines (724) whether the finger input on the haptic display occurs at a location that corresponds to the first key or at a location that corresponds to the second key. In response to determining that the finger input on the haptic display occurs at the location that corresponds to the first key, the device sends (726) instructions to the haptic display to provide haptic feedback of a third type at a location on the haptic display that corresponds to the first key (e.g., haptic feedback that corresponds to an ivory key). In response to determining that the finger input on the haptic display occurs at the location that corresponds to the second key, the device sends (728) instructions to the haptic display to provide haptic feedback of a fourth type at a location on the haptic display that corresponds to the second key (e.g., haptic feedback that corresponds to an ebony key). In some embodiments, the haptic feedback of the fourth type is distinct from the haptic feedback of the third type. For example, the haptic feedback of the third type may correspond to a smooth surface and the haptic feedback of the fourth type may correspond to a textured surface of wood. For example, haptic feedback 5088 (FIG. 5W) for contact 5086 over virtual black key 5084-1 is different from haptic feedback 5092 (FIG. 5X) for contact 5090 over virtual white key 5082-1.

In some embodiments, the device sends (730) instructions to the haptic display to display one or more control elements. In some embodiments, the electronic device sends instructions to concurrently display the one or more control elements while displaying a plurality of playable elements. In some embodiments, the one or more control elements include one or more of: a microphone, a switch, a knob, a slider, etc. While the one or more control elements are displayed on the haptic display (732), the device receives (734) an input that corresponds to a finger input on the haptic display at a location that corresponds to a respective control element. In response to receiving the input that corresponds to the finger input on the haptic display at the location that corresponds to the respective control element, the device sends (736) instructions to the haptic display to provide haptic feedback at the location on the haptic display that corresponds to the respective control element. For example, in some embodiments, the electronic device sends instructions to the haptic display to provide haptic feedback that corresponds to a microphone such that a user touching a microphone user interface element (e.g., a microphone icon) feels a texture that corresponds to a metal wire mesh of a microphone. In some embodiments, the electronic device may send instructions to display one or more control elements and instructions to provide haptic feedback that corresponds to a respective control element without sending instructions to display a plurality of playable elements. For example, the electronic device may display a microphone icon in a voice recorder application in which no playable element of a musical instrument is displayed.

For example, virtual switch 5066 is displayed in virtual guitar interface 5060 (FIG. 5T). In response to receiving an input with contact 5076 over virtual switch 5066, haptic feedback 5078, corresponding to virtual switch 5066, is output at the location of contact 5076.

In some embodiments, the device determines (738) whether the finger input on the haptic display satisfies predefined playable element activation criteria. In some embodiments, the predefined playable element activation criteria include one or more of pressure, area, and duration of the finger input. In some embodiments, respective playable elements are associated with respective predefined playable element activation criteria. For example, the first playable element may be associated with a first predefined playable element activation criteria, and the second playable element may be associated with a second predefined playable element activation criteria distinct from the first predefined playable element activation criteria. In some embodiments, the electronic device determines whether the finger input satisfies respective predefined playable element activation criteria for the first playable element. In accordance with a determination that the finger input on the haptic display satisfies predefined playable element activation criteria, the device outputs (740) an audio signal that corresponds to the first playable element. In some embodiments, at least a portion of the audio signal is output while the haptic feedback that corresponds to the first playable element is provided. In some embodiments, in accordance with a determination that the finger input does not satisfy the predefined playable element activation criteria, the electronic device foregoes outputting the audio signal that corresponds to the first playable element.

For example, FIGS. 5X-5Y illustrates different inputs, one with contact 5090 and the other with contact 5093, detected on key 5082-1. The input with contact 5090 (e.g., a contact hover) does not activate playing of key 5082-1, and no sound is output. The input with contact 5093 (e.g., a tap gesture) does activate playing of key 5082-1, and a sound is output.

In some embodiments, the device determines (742) that the finger input is detected on the haptic display at the location that corresponds to the first playable element while the audio signal that corresponds to the first playable element is not being output. In response to determining that the finger input is detected on the haptic display at the location that corresponds to the first playable element while the audio signal that corresponds to the first playable element is not being output, the device sends (744) instructions to the haptic display to provide haptic feedback of an inactive type that corresponds to the first playable element. In some embodiments, the haptic feedback of the inactive type that corresponds to the first playable element includes the haptic feedback that corresponds to the first playable element when the first playable element is inactive. For example, in some embodiments, haptic feedback of an inactive type that corresponds to the first playable element includes haptic feedback that corresponds to a stationary string.

The device determines (746) that a touch input is detected on the haptic display at a location that corresponds to the first playable element while the audio signal that corresponds to the first playable element is being output. In some embodiments, the touch input detected at the location that corresponds to the first playable element is a continuation of the finger input. For example, the finger input may continue to remain at the location that corresponds to the first playable element. In some embodiments, the touch input detected at the location that corresponds to the first playable element is distinct from the finger input. For example, subsequent to detecting the finger input on the haptic display at the location that corresponds to the first playable element, the finger input may be removed from the haptic display and then a subsequent touch input distinct from the first finger input may be detected at a location that corresponds to the first playable element. In response to determining that the touch input is detected on the haptic display at the location that corresponds to the first playable element while the audio signal that corresponds to the first playable element is being output, the device sends (748) instructions to the haptic display to provide haptic feedback of an active type that corresponds to the first playable element. In some embodiments, the haptic feedback of the active type that corresponds to the first playable element includes the haptic feedback that corresponds to the first playable element when the first playable element is activated. For example, in some embodiments, haptic feedback of an active type that corresponds to the first playable element includes haptic feedback that corresponds to a vibrating string.

For example, haptic feedback 5094 for key 5082-1 that is playing is different from haptic feedback 5092 for key 5082-1 that is not playing.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600 and 800 (e.g., FIGS. 6A-6B and 8A-8B respectively) are also applicable in an analogous manner to method 700 described above with respect to FIGS. 7A-7C. For example, the inputs and contacts described above with reference to method 700 may have one or more of the characteristics of the inputs and contacts described herein with reference to methods 600 and 800. For brevity, these details are not repeated here.

FIGS. 8A-8B are flow diagrams illustrating a method 800 of presenting changes to user interface elements in accordance with some embodiments. The method 800 is performed at an electronic device (e.g., device 300, FIG. 3, or portable multifunction device 100, FIG. 1) in communication with a haptic feedback device integrated with a touch-sensitive surface. In some embodiments, the haptic feedback device integrated with the touch-sensitive surface is a haptic display that is also a touch screen display, and the touch-sensitive surface is on the haptic display. In some embodiments, the haptic feedback device is separate from the touch-sensitive surface. In some embodiments, a haptic feedback device includes a tactile display, a refreshable haptic display, and/or a refreshable tactile display. Typically, the haptic feedback device is configured to provide haptic feedback. However, the haptic feedback device is not necessarily configured to output visual information. In some embodiments, the haptic feedback device includes a display (e.g., a liquid-crystal-display screen). Some operations in method 800 may be combined and/or the order of some operations may be changed.

As described below, the method 800 provides an intuitive way to present changes to user interface elements. The method reduces the cognitive burden on a user when perceiving changes to user interface elements, thereby creating a more efficient human-machine interface. For battery-operated electronic devices, enabling a user to perceive changes to user interface elements faster and more efficiently conserves power and increases the time between battery charges.

The device sends (802) instructions to the haptic feedback device to tactilely present a user interface that includes a plurality of user interface elements on the haptic feedback device, where a first user interface element corresponds to a first location on the haptic feedback device. For example, in some embodiments, the haptic feedback device presents bumps along edges of respective user interface elements. In some embodiments, the haptic feedback device presents Braille characters that correspond to non-Braille characters in the user interface. For example, in FIG. 5Z, the device instructs touch screen 112 to output haptic feedback 5104 at the location of contact 5102. Haptic feedback 5104 conveys the boundary of icon 444.

The device receives (814) a request to present a change to the first user interface element. For example, a software application sends a request to dim or brighten the first user interface element. In another example, a software application sends a request to display or update a badge for the first user interface element. For example, when the first user interface element is an icon for a mail application, the mail application sends a request to display an updated number of unread emails in a badge for the mail application icon. For example, when the device receives new email, the device newly displays or updates badge 410 (FIG. 5BB) with icon 418.

In response to receiving the request to present the change to the first user interface element, the device sends (818) instructions to the haptic feedback device to indicate the location of the first user interface element by providing haptic feedback of a first type at least at a respective location on the haptic feedback device distinct from the first location.

An exemplary request to present a change to the first user interface element is a request to present a badge over an icon (e.g., present a number of unread emails over a mail icon). For example, the device instructs touch screen 112 to generate haptic feedback 5110 when badge 410 is newly displayed or updated.

In response to receiving the request to present the change to the first user interface element, the device sends (820) instructions to the haptic feedback device to indicate the change to the first user interface element at the first location by providing haptic feedback of a second type at least at the first location. In some embodiments, the haptic feedback of the second type is distinct from the haptic feedback of the first type. For example, the haptic feedback device may present additional bumps (e.g., corresponding to a badge) adjacent to the bumps representing the edges of the first user interface element. In some embodiments, the haptic feedback device concurrently provide the haptic feedback of the first type at least at the respective location on the haptic feedback device and the haptic feedback of the second type at least at the first location. For example, when contact 5102 is located over icon 418 and newly displayed badge 410, the device instructs touch screen 112 to output haptic feedback 5108 (conveying the boundary of icon 418) and haptic feedback 5112 (conveying the boundary of badge 410).

In some embodiments, prior to receiving the request to present the change to the first user interface element (804), the device receives (806) a request to present the first user interface element at the first location on the haptic feedback device. In response to receiving the request to present the first user interface element at the first location on the haptic feedback device, the device sends (808) instructions to the haptic feedback device to indicate the first location of the first user interface element by providing haptic feedback of a third type at least at the respective location on the haptic feedback device distinct from the first location. For example, prior to badge 410 being displayed, as in FIG. 5Z, the device instructs touch screen 112 to generate haptic feedback 5106 to indicate the location of icon 418 to contact 5102.

In some embodiments, the haptic feedback of the third type is distinct from the haptic feedback of the first type (810). In some embodiments, the haptic feedback of the first type and the haptic feedback of the third type have a same haptic pattern, the haptic feedback of the first type has a first magnitude, and the haptic feedback of the third type has a second magnitude distinct from the first magnitude. In some embodiments, the haptic feedback of the first type has a first pattern, and the haptic feedback of the third type has a second pattern distinct from the first pattern. For example, the haptic feedback of the first type may have a ripple (or sinusoidal wave) pattern, and the haptic feedback of the third type may have a pulse (or square wave) pattern (and vice versa). In some embodiments, the haptic feedback of the third type is distinct from the haptic feedback of the second type. For example, haptic feedback 5106 (prior to badge 410 being displayed, FIG. 5Z) and haptic feedback 5110 (when badge 410 is displayed, FIG. 5BB) are distinct from each other (e.g., different pattern, different amplitude, as shown in FIG. 5DD).

In some embodiments, in response to receiving the request to present the first user interface element at the first location on the haptic feedback device, the device sends (812) instructions to the haptic feedback device to indicate the first user interface element at the first location by providing haptic feedback of a fourth type at least at the first location. For example, the haptic feedback device may present bumps representing the edges of the first user interface element. In some embodiments, the haptic feedback device concurrently provide the haptic feedback of the third type at least at the respective location on the haptic feedback device and the haptic feedback of the fourth type at least at the first location. For example, prior to badge 410 being displayed, which contact 5102 is located over mail icon 418 (FIG. 5AA), the device instructs touch screen 112 to output haptic feedback 5108 conveying the boundary of icon 418.

In some embodiments, prior to sending instructions to the haptic feedback device to indicate the location of the first user interface element by providing haptic feedback (e.g., the haptic feedback of the first type and/or the haptic feedback of the second type) at least at the respective location on the haptic feedback device, the device determines (816) that a touch is detected at the respective location on the haptic feedback device. In some embodiments, prior to sending instructions to indicate the location of the first user interface, the electronic device determines that the touch is detected at a location on the haptic feedback device that does not correspond to the first location on the haptic feedback device. In some embodiments, prior to sending instructions for indicating the location of the first user interface element, the electronic device determines that no touch is detected at the first location on the haptic feedback device. For example, the device determines the location of contact 5102 in order to determine a direction to which haptic feedback 5110 (FIG. 5BB) is directed towards and/or whether to output haptic feedback 5108 and 5112 (FIG. 5CC).

In some embodiments, providing haptic feedback to indicate the location of the first user interface element includes (822) providing haptic feedback that radiates from the first location on the haptic feedback device to the respective location on the haptic feedback device. In some embodiments, the haptic feedback of the first type includes haptic feedback that has a ripple or wave pattern originating from the first location on the haptic feedback device. For example, haptic feedback 5106 and haptic feedback 5110 are radiated from icon 418 toward contact 5102.

In some embodiments, providing haptic feedback that radiates from the first location on the haptic feedback device to the respective location on the haptic feedback device includes (824) providing haptic feedback that radiates from the first location on the haptic feedback device in a predefined area on the haptic feedback device adjacent to the respective location on the haptic feedback device without providing haptic feedback that radiates from the first location on the haptic feedback device at locations on the haptic feedback device outside the predefined area on the haptic feedback device. For example, the haptic feedback that radiates from the first location on the haptic feedback is provided along a linear region from the first location on the haptic feedback device to the respective location on the haptic feedback device. This reduces the need for providing the haptic feedback on an entire haptic feedback surface of the haptic feedback device, thereby saving energy (e.g., battery-stored energy). In some embodiments, providing haptic feedback to indicate the location of the first user interface element includes providing the haptic feedback to indicate the location of the first user interface element over an entire haptic feedback surface of the haptic feedback device. For example, haptic feedback 5106 and haptic feedback 5110 are radiated toward contact 5102 in a directed, width-limited path, rather than rippled across the entire touch screen 112.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600 and 700 (e.g., FIGS. 6A-6B and 7A-7C respectively) are also applicable in an analogous manner to method 800 described above with respect to FIGS. 8A-8B. For example, the inputs and contacts described above with reference to method 800 may have one or more of the characteristics of the inputs and contacts described herein with reference to methods 600 and 700. For brevity, these details are not repeated here.

Figure 9:
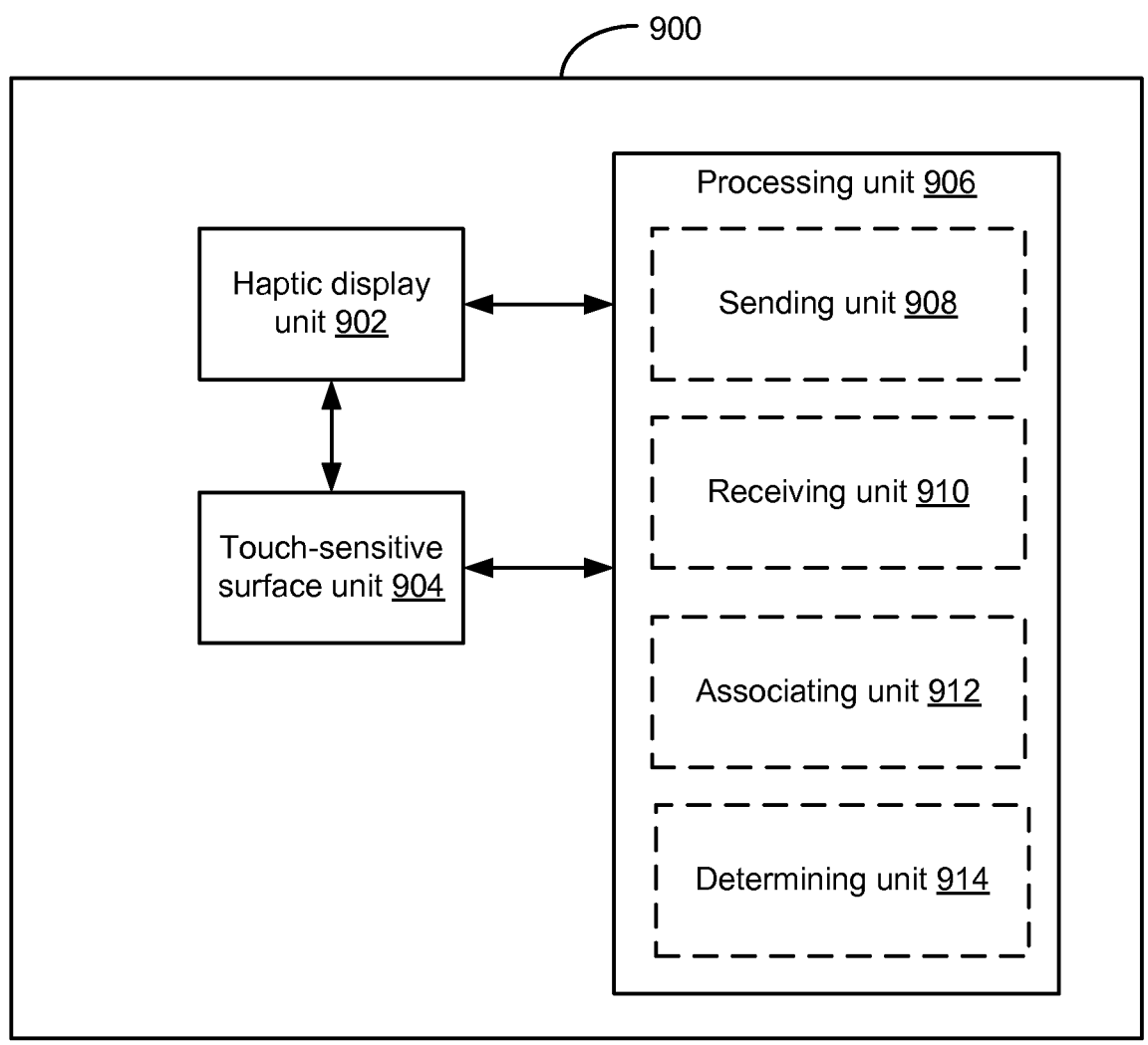
FIG. 9 is a functional block diagram of an electronic device in accordance with some embodiments.

In accordance with some embodiments, FIG. 9 shows a functional block diagram of an electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, an electronic device 900, in communication with a haptic display unit 902 that includes a touch-sensitive surface unit 904, includes a processing unit 906. In some embodiments, the processing unit includes a sending unit 908, a receiving unit 910, an associating unit 912, and a determining unit 914.

The processing unit 906 is configured to: send instructions to the haptic display unit 902 to display at least a portion of a document that includes a plurality of characters (e.g., with the sending unit 908), wherein a respective character is displayed at a respective displayed character size on the haptic display unit 902; while the haptic display unit 902 is displaying at least the portion of the document, receive an input that corresponds to a finger contact at a first location on the haptic display unit 902 (e.g., with the receiving unit 910); and, in response to receiving the input that corresponds to the finger contact at the first location on the haptic display unit 902: associate a first cursor position with the first location on the haptic display unit 902 (e.g., with the associating unit 912); determine a first character in the plurality of characters adjacent to the first cursor position (e.g., with the determining unit 914); and send instructions to the haptic display unit 902 to output a Braille character, at the first location on the haptic display unit 902, that corresponds to the first character (e.g., with the sending unit 908), wherein a respective Braille character is output on the haptic display unit 902 at a respective Braille character size, the respective Braille character size being larger than the corresponding displayed character size.

In some embodiments, the processing unit 906 is configured to: send instructions to the haptic display unit 902 to display a plurality of playable elements of one or more musical instruments (e.g., with the sending unit 908); and, while the plurality of playable elements is displayed on the haptic display unit 902: receive an input that corresponds to a finger input on the haptic display unit 902 at a location that corresponds to a first playable element (e.g., with the receiving unit 910); and, in response to receiving an input that corresponds to the finger input on the haptic display unit 902 at the location that corresponds to the first playable element, send instructions to the haptic display unit 902 to provide haptic feedback that corresponds to the first playable element (e.g., with the sending unit 908).

Figure 10:
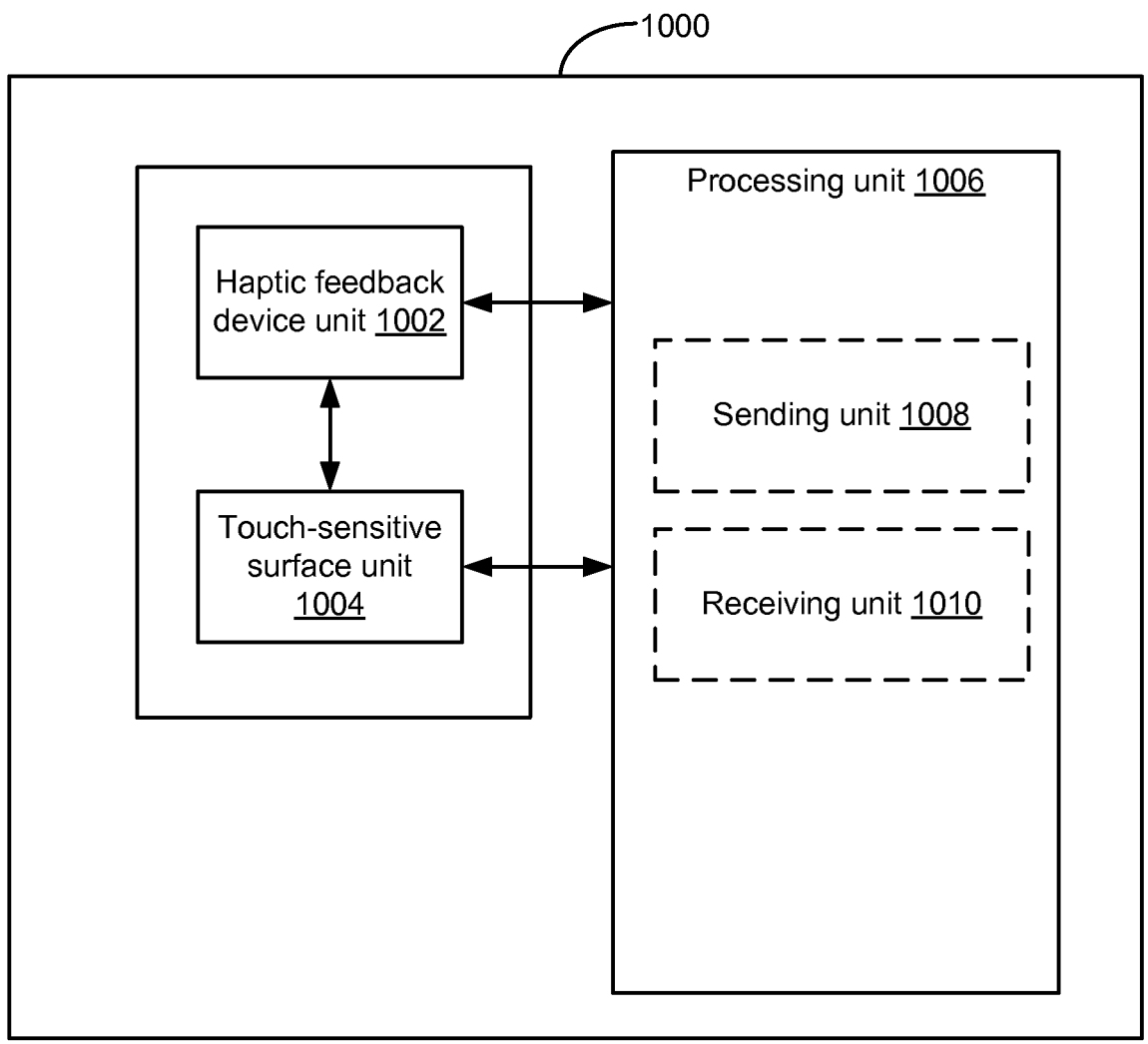
FIG. 10 is a functional block diagram of an electronic device in accordance with some embodiments.

In accordance with some embodiments, FIG. 10 shows a functional block diagram of an electronic device 1000 configured in accordance with the principles of the invention as described above. The functional blocks of the device may be implemented by hardware, software, or a combination of hardware and software to carry out the principles of the invention. It is understood by persons of skill in the art that the functional blocks described in FIG. 10 may be combined or separated into sub-blocks to implement the principles of the invention as described above. Therefore, the description herein may support any possible combination or separation or further definition of the functional blocks described herein.

As shown in FIG. 10, an electronic device 1000, in communication with a haptic feedback device unit 1002 integrated with a touch-sensitive surface unit 1004, includes a processing unit 1006. In some embodiments, the processing unit includes a sending unit 1008, and a receiving unit 1010.

The processing unit 1006 is configured to: send instructions to the haptic feedback device unit 1002 to tactilely present a user interface that includes a plurality of user interface elements on the haptic feedback device unit 1002 (e.g., with the sending unit 1008), wherein a first user interface element corresponds to a first location on the haptic feedback device unit 1002; receive a request to present a change to the first user interface element (e.g., with the receiving unit 1010); and, in response to receiving the request to present the change to the first user interface element, send instructions to the haptic feedback device unit 1002 to indicate the location of the first user interface element by providing haptic feedback of a first type at least at a respective location on the haptic feedback device unit 1002 distinct from the first location (e.g., with the sending unit 1008).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 6A-6B, 7A-7C, or 8A-8B are, optionally, implemented by components depicted in FIGS. 1A-1B or FIGS. 9-11. For example, receiving operation 604, associating operation 608, and determination operation 618, and sending operation 620 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface, or a change in the display properties of an object (e.g., changing the z-order of the object relative to a second object). When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. An electronic device in communication with a haptic display that includes a touch-sensitive surface, comprising:
one or more processors;
memory; and
one or more programs, wherein the one or more programs are stored in the memory and configured to be executed by the one or more processors, the one or more programs including instructions for:
sending instructions to the haptic display to display at least a portion of a document that includes a plurality of characters, wherein a respective character is displayed at a respective displayed character size on the haptic display;
while the haptic display is displaying at least the portion of the document, receiving an input that corresponds to a finger contact at a first location on the haptic display; and,
in response to receiving the input that corresponds to the finger contact at the first location on the haptic display:
associating a first cursor position with the first location on the haptic display;
determining a first character in the plurality of characters adjacent to the first cursor position; and
sending instructions to the haptic display to output a Braille character, at the first location on the haptic display, that corresponds to the first character, wherein a respective Braille character is output on the haptic display at a respective Braille character size, the respective Braille character size being larger than the corresponding displayed character size.

2. The device of claim 1, including instructions for:
determining that the finger contact remains at the first location on the haptic display; and,
in response to determining that the finger contact remains at the first location on the haptic display, sending instructions to the haptic display to horizontally scroll multiple Braille characters, at the first location on the haptic display, that correspond to displayed characters following the first character in the plurality of characters.

3. The device of claim 1, including instructions for:
after sending instructions to the haptic display to output a Braille character that corresponds to the first character, determining that the finger contact has moved across the haptic display to a second location; and,
in accordance with the determination that the finger contact has moved across the haptic display to the second location on the haptic display:
associating a second cursor position with the second location on the haptic display;
determining a second character in the plurality of characters adjacent to the second cursor position; and
sending instructions to the haptic display to output a Braille character that corresponds to the second character, at a Braille character size that is larger than the corresponding displayed character size of the second character, at the second location on the haptic display.

4. The device of claim 1, wherein:
the first location corresponds to a word displayed on the haptic display; and
the first cursor position corresponds to an initial character of the word.

5. The device of claim 1, wherein:
the first location corresponds to a line of text displayed on the haptic display; and
the first cursor position corresponds to an initial character of the line of text.

6. The device of claim 1, wherein:
the first location corresponds to a sentence of the document; and
the first cursor position corresponds to an initial character of the sentence.

7. The device of claim 1, wherein:
the first location corresponds to a respective user interface element of the document; and
the first cursor position corresponds to an initial character of a text that corresponds to the respective user interface element.

8. The device of claim 1, including instructions for:
outputting audio signals that correspond to one or more Braille characters output by the haptic display.

9. A method, comprising:
at an electronic device in communication with a haptic display that includes a touch-sensitive surface:
sending instructions to the haptic display to display at least a portion of a document that includes a plurality of characters, wherein a respective character is displayed at a respective displayed character size on the haptic display;
while the haptic display is displaying at least the portion of the document, receiving an input that corresponds to a finger contact at a first location on the haptic display; and,
in response to receiving the input that corresponds to the finger contact at the first location on the haptic display:
associating a first cursor position with the first location on the haptic display;
determining a first character in the plurality of characters adjacent to the first cursor position; and
sending instructions to the haptic display to output a Braille character, at the first location on the haptic display, that corresponds to the first character, wherein a respective Braille character is output on the haptic display at a respective Braille character size, the respective Braille character size being larger than the corresponding displayed character size.

10. The method of claim 9, including:
determining that the finger contact remains at the first location on the haptic display; and, in response to determining that the finger contact remains at the first location on the haptic display, sending instructions to the haptic display to horizontally scroll multiple Braille characters, at the first location on the haptic display, that correspond to displayed characters following the first character in the plurality of characters.

11. The method of claim 9, including:
after sending instructions to the haptic display to output a Braille character that corresponds to the first character, determining that the finger contact has moved across the haptic display to a second location; and,
in accordance with the determination that the finger contact has moved across the haptic display to the second location on the haptic display:
  associating a second cursor position with the second location on the haptic display;
  determining a second character in the plurality of characters adjacent to the second cursor position; and
  sending instructions to the haptic display to output a Braille character that corresponds to the second character, at a Braille character size that is larger than the corresponding displayed character size of the second character, at the second location on the haptic display.

12. The method of claim 9, wherein:
the first location corresponds to a word displayed on the haptic display; and
the first cursor position corresponds to an initial character of the word.

13. The method of claim 9, wherein:
the first location corresponds to a line of text displayed on the haptic display; and
the first cursor position corresponds to an initial character of the line of text.

14. The method of claim 9, wherein:
the first location corresponds to a sentence of the document; and
the first cursor position corresponds to an initial character of the sentence.

15. The method of claim 9, wherein:
the first location corresponds to a respective user interface element of the document; and
the first cursor position corresponds to an initial character of a text that corresponds to the respective user interface element.

16. The method of claim 9, including:
outputting audio signals that correspond to one or more Braille characters output by the haptic display.

17. A non-transitory computer readable storage medium storing one or more programs, the one or more programs comprising instructions, which when executed by an electronic device in communication with a haptic display that includes a touch-sensitive surface, cause the device to:
  send instructions to the haptic display to display at least a portion of a document that includes a plurality of characters, wherein a respective character is displayed at a respective displayed character size on the haptic display;
  while the haptic display is displaying at least the portion of the document, receive an input that corresponds to a finger contact at a first location on the haptic display; and,
  in response to receiving the input that corresponds to the finger contact at the first location on the haptic display:
    associate a first cursor position with the first location on the haptic display;
    determine a first character in the plurality of characters adjacent to the first cursor position; and
    send instructions to the haptic display to output a Braille character, at the first location on the haptic display, that corresponds to the first character, wherein a respective Braille character is output on the haptic display at a respective Braille character size, the respective Braille character size being larger than the corresponding displayed character size.

18. The non-transitory computer readable storage medium of claim 17, including instructions which, when executed, cause the device to:
  determine that the finger contact remains at the first location on the haptic display; and,
  in response to determining that the finger contact remains at the first location on the haptic display, send instructions to the haptic display to horizontally scroll multiple Braille characters, at the first location on the haptic display, that correspond to displayed characters following the first character in the plurality of characters.

19. The non-transitory computer readable storage medium of claim 17, including instructions which, when executed, cause the device to:
  after sending instructions to the haptic display to output a Braille character that corresponds to the first character, determine that the finger contact has moved across the haptic display to a second location; and,
  in accordance with the determination that the finger contact has moved across the haptic display to the second location on the haptic display:
    associate a second cursor position with the second location on the haptic display;
    determine a second character in the plurality of characters adjacent to the second cursor position; and
    send instructions to the haptic display to output a Braille character that corresponds to the second character, at a Braille character size that is larger than the corresponding displayed character size of the second character, at the second location on the haptic display.

20. The non-transitory computer readable storage medium of claim 17, wherein:
the first location corresponds to a word displayed on the haptic display; and
the first cursor position corresponds to an initial character of the word.

21. The non-transitory computer readable storage medium of claim 17, wherein:
the first location corresponds to a line of text displayed on the haptic display; and
the first cursor position corresponds to an initial character of the line of text.

22. The non-transitory computer readable storage medium of claim 17, wherein:
the first location corresponds to a sentence of the document; and
the first cursor position corresponds to an initial character of the sentence.

23. The non-transitory computer readable storage medium of claim 17, wherein:
the first location corresponds to a respective user interface element of the document; and
the first cursor position corresponds to an initial character of a text that corresponds to the respective user interface element.

24. The non-transitory computer readable storage medium of claim 17, including instructions which, when executed, cause the device to:

output audio signals that correspond to one or more Braille characters output by the haptic display.

* * * * *